US008964695B2

(12) United States Patent
Bachmann et al.

(10) Patent No.: US 8,964,695 B2
(45) Date of Patent: Feb. 24, 2015

(54) OPTIMIZATION OF HANDOVERS TO UNTRUSTED NON-3GPP NETWORKS

(75) Inventors: Jens Bachmann, Langen (DE); Genadi Velev, Langen (DE); Shinkichi Ikeda, Kadoma (JP); Jun Hirano, Kadoma (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 927 days.

(21) Appl. No.: 13/063,165

(22) PCT Filed: Sep. 23, 2009

(86) PCT No.: PCT/EP2009/006882
§ 371 (c)(1),
(2), (4) Date: May 13, 2011

(87) PCT Pub. No.: WO2010/034483
PCT Pub. Date: Apr. 1, 2010

(65) Prior Publication Data
US 2011/0216743 A1    Sep. 8, 2011

(30) Foreign Application Priority Data
Sep. 23, 2008    (EP) .................................. 08016714

(51) Int. Cl.
| | |
|---|---|
| *H04W 4/00* | (2009.01) |
| *H04W 36/00* | (2009.01) |
| *H04W 12/08* | (2009.01) |
| *H04L 29/06* | (2006.01) |

(52) U.S. Cl.
CPC ............. *H04W 12/08* (2013.01); *H04L 63/164* (2013.01); *H04W 36/0011* (2013.01)
USPC .......................................... 370/331; 455/437

(58) Field of Classification Search
None
See application file for complete search history.

(56) References Cited

U.S. PATENT DOCUMENTS

| | | | |
|---|---|---|---|
| 2007/0047491 A1 | 3/2007 | Dutta | |
| 2008/0318575 A1* | 12/2008 | Ulupinar et al. .............. | 455/436 |

(Continued)

FOREIGN PATENT DOCUMENTS

| | | |
|---|---|---|
| JP | 2008-519568 | 6/2008 |
| WO | 2004/107702 | 12/2004 |

(Continued)

OTHER PUBLICATIONS

International Search Report dated Oct. 27, 2009.

(Continued)

*Primary Examiner* — Ashley Shivers
(74) *Attorney, Agent, or Firm* — Dickinson Wright PLLC

(57) ABSTRACT

The invention relates to a method for ensuring IP session continuity upon a handover of a mobile node to a non-3GPP network, wherein an ongoing IP session of the mobile node goes via a packet data network gateway. For non-3GPP networks it is necessary to discover a security gateway and to then establish the corresponding tunnels to the ePDG to form the new data path; a security tunnel between the mobile node and the security gateway, and an IP tunnel between the packet data network gateway and the security gateway. In order to prepare the handover to possible non-3GPP accesses, the two tunnels are pre-established, however maintained deactivated until their use is actually needed. Accordingly, when handing over to the non-3GPP network, the IP session may be continued without any significant interruption by activating the already established tunnels.

19 Claims, 15 Drawing Sheets

(56) References Cited

U.S. PATENT DOCUMENTS

| | | | | |
|---|---|---|---|---|
| 2009/0290556 | A1* | 11/2009 | Taaghol | 370/331 |
| 2010/0049969 | A1* | 2/2010 | Shon | 713/156 |
| 2010/0054207 | A1* | 3/2010 | Gupta et al. | 370/331 |
| 2010/0284368 | A1* | 11/2010 | Haddad et al. | 370/331 |
| 2011/0063997 | A1* | 3/2011 | Gras et al. | 370/254 |
| 2011/0122824 | A1* | 5/2011 | Muhanna et al. | 370/328 |

FOREIGN PATENT DOCUMENTS

| | | |
|---|---|---|
| WO | WO 2006/052563 | 5/2006 |
| WO | 2008/103488 | 8/2008 |

OTHER PUBLICATIONS

European Search Report dated Feb. 19, 2009.

3GPP TS 23.402 V8.0.0, "3rd Generation Partnership Project; Technical Specification Group Services and System Aspects; Architecture enhancements for non-3GPP accesses (Release 8)," Dec. 2007, pp. 1-131.

3GPP TSG SA WG2 Architecture—S2#56c Rel-8 Ad-hoc, "Attachment and Handover between untrusted non-3GPP Accesses with MOBIKE," Siemens Networks, Nokia, S2-071240, Mar. 26-30, 2007, pp. 1-12.

3GPP TSG SA WG2 Architecture—S2#57, "3GPP to non-3GPP handover," Panasonic, S2-071958, Apr. 23-27, 2007, pp. 1-3.

3GPP TSG SA WG2 Architecture—S2#58, "Key Issue: EPC 3GPP/non-3GPP Optimized handoffs (TR 23.882)," Motorola, S2-072992, pp. 1-5.

3GPP TSG SA WG2 Meeting #65, "Resolve Timing problem of non-optimized handover flows from EUTRAN to non-3GPP accesses via S2a/S2b," NEC, Alcatel-Lucent, TD S2-083690, May 12-16, 2008, pp. 1-3.

3GPP TSG-SA2 Meeting #65, "Corrections of References," Panasonic, TD S2-083439, May 12-16, 2008, pp. 1-29.

L. Zhang, et al., "A New Seamless Method to Support CDMA2000/WLAN Vertical Handover," IEEE, May 2006, pp. 214-218.

P. Eronen, "IKEv2 Mobility and Multihoming Protocol (MOBIKE)," IETF RFC 4555, Jun. 2006, pp. 1-33.

B. Haley, et al., "Mobility Header Home Agent Switch Message," IETF Internet Draft, draft-ietf-mip6-ha-switch-00.txt, Jun. 2006, pp. 1-11.

Japanese Notice of Reasons for Rejection dated Dec. 17, 2013 with English translation.

* cited by examiner

OPTIMIZATION OF HANDOVERS TO UNTRUSTED NON-3GPP NETWORKS

FIELD OF THE INVENTION

The invention relates to a method for ensuring session continuity upon a handover of a mobile node to a non-3GPP network, when using a security gateway to allow communications between the unsecure non-3GPP network and the secure 3GPP core network. The handover of the mobile node is to be expedited by interactions between the various entities in the forefront of the actual handover. Furthermore, the invention relates to a mobile node, a security gateway and a packet data network gateway that participate in the invention.

TECHNICAL BACKGROUND

UMTS (Universal Mobile Telecommunications System) is the 3G ($3^{rd}$ Generation) mobile communication system standardised by 3GPP ($3^{rd}$ Generation Partnership Project). The 3GPP launched a study item "Evolved UTRA and UTRAN" better known as "Long Term Evolution (LTE)". The study will investigate means of achieving major leaps in performance in order to improve service provisioning, and to reduce user and operator costs. Out of that and because interworking with other radio access technologies should be possible, the need arose for a new evolved Packet Core Network.

An exemplary representation of the E-UTRAN architecture is given in FIG. 1. The E-UTRAN consists of evolved Node Bs (eNB or eNodeB), providing the E-UTRA user plane (PDCP/RLC/MAC/PHY) and control plane (RRC) protocol terminations towards the mobile node.

The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Quality of Service), cell information broadcast, ciphering/deciphering of user and control plane data, and compression/decompression of DL/UL user plane packet headers. The eNBs are also connected by means of the S1 interface to the EPC (Evolved Packet Core), more specifically to the MME (Mobility Management Entity) by means of the S1-MME, and to the Serving Gateway (S-GW) by means of the S1-U.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the Home Subscriber Server, HSS). It checks the authorization of the UE to camp on the service provider's Public Land Mobile Network (PLMN) and enforces UE roaming restrictions. The MME is the termination point in the network for ciphering/integrity protection for NAS signaling and handles the security key management. The MME also provides the control plane function for mobility between LTE and 2G/3G access networks with the S3 interface terminating at the MME from the SGSN (Serving GPRS Support Node). The MME also terminates the S6a interface towards the home HSS for roaming UEs.

The Packet Data Network Gateway (PDN-GW) provides connectivity for the UE to external packet data networks by being the point of exit and entry of traffic for the UE. A UE may have simultaneous connectivity with more than one PDN-GW for accessing multiple PDNs. The PDN-GW performs policy enforcement, packet filtering for each user, charging support, lawful Interception and packet screening. Another key role of the PDN-GW is to act as the anchor for mobility between 3GPP and non-3GPP technologies.

To summarize the above, in order to support the new E-UTRAN access, the new 3GPP Core Network is mainly separated into three logical entities. At first, in the user plane the PDN-GW is the gateway to the external networks and the global mobility anchor for mobility between 3GPP and non-3GPP access technologies (likeCDMA2000, WIMAX or WIFI). Second, another user plane entity, the Serving Gateway, is the mobility anchor for mobility between 3GPP accesses (E-UTRAN, UTRAN, GERAN). Third, a Mobility Management Entity is the control plane entity responsible for the mobility management of mobile terminals (also referred to in the following as UEs or MNs) moving between different EUTRAN base stations (eNodeBs) and also responsible for the session management.

As described above, the MME is responsible for mobility management and session management. For each mobile terminal attached to an MME, specific mobility management and evolved packet system context information is stored in the MME. These contexts comprise, e.g. the mobility state, the temporary identity, the current Tracking Area List, last known cell, authentication vectors, access restrictions, subscribed QoS profile, subscribed charging characteristics, and for each active PDN connection the APN (Access Point Name) in use, IPv4/IPv6 addresses, PDN-GW address for control plane, and also information for each EPS (Evolved Packet System) bearer within the PDN connection, as for example EPS bearer QoS profile, EPS bearer charging characteristics.

The mobility management within the 3GPP system is network controlled, and two protocol variants are standardised for the interface between the PDN-GW and the S-GW. One is based on GTP (GPRS Tunneling Protocol), the protocol used in the legacy GPRS (General Packet Radio Service) system, and the other one is Proxy Mobile IPv6 (PMIPv6), developed in the IETF (Internet Engineering Task Force). For interworking with non-3GPP accesses, the mobile terminal can be connected to the Core Network, i.e. the PDN-GW, via PMIPv6 as well, in case the non-3GPP access supports PMIPv6. Alternatively, if the mobile terminal does not support inter-access handover with PMIPv6 or if the non-3GPP access does not support PMIPv6, the mobile terminal can be connected to the Core Network via Client Mobile IP versions, i.e. Mobile IPv4 Foreign Agent Mode (MIP4FA) or Dual Stack Mobile IPv6 (DSMIPv6).

Before a mobile terminal can access a non-3GPP access network, access authentication needs to be performed. If 3GPP based access authentication is applied in the non-3GPP access, i.e. the 3GPP AAA server/HSS authenticates the mobile terminal, EAP-AKA (Extensible Authentication Protocol-Authentication and Key Agreement) is used.

When the mobile terminal is active in a non-3GPP access network, there is a local IP address used to route packets to the mobile terminal in the non-3GPP access. This IP address is the Care-of Address in the terminology of Mobile IP. In case of DSMIPv6, the address is assigned to the mobile terminal, and the mobile terminal is sending Binding Updates using its Care-of address to the PDN-GW, which has the function of the Home Agent (HA). In case of PMIPv6, the Care-of address is an address of a Mobile Access Gateway (MAG) that is located in the non-3GPP access network, and the MAG is sending Proxy Binding Updates using its (Proxy-) Care-of Address to the PDN-GW of the 3GPP network, which has the function of the Local Mobility Anchor (LMA).

As described above, two different types of non-3GPP accesses are defined, i.e. untrusted non-3GPP access and trusted non-3GPP access, and whether a non-3GPP access is trusted or not is left to the 3GPP operator. Furthermore, a non-3GPP access may be a trusted access for one UE from an operator A and an untrusted access for another UE from operator A.

When the UE moves into or attaches initially in an untrusted non-3GPP access (FIG. 2), it has to discover an ePDG first, establish an IPsec Key Exchange IKEv2/IPsec tunnel with the ePDG and can connect to the Evolved Packet Core EPC (PDN GW) over the ePDG IPsec tunnel between PDN-GW and ePDG. On the other hand, when the UE moves into or attaches initially in a trusted non-3GPP access (see FIG. 3), it can connect directly to the EPC (PDN GW) via an MIP tunnel.

When a UE performs a handover to an untrusted non-3GPP access network, the UE must first discover an ePDG and then establish a secure tunnel to said ePDG, before the UE can send and receive user data.

The discovery of the ePDG and the establishment of the secure tunnel takes time, and thus the handover to the untrusted non-3GPP network access is further delayed. This may entail various disadvantages such as data loss, degradation of communication quality and speech interruptions.

SUMMARY OF THE INVENTION

Therefore, in view of the above problems in the state of the art, one object of the invention is to provide an improved method for ensuring IP session continuity upon a handover of a mobile node to an untrusted non-3GPP network.

At least one of the above objects is solved by the subject-matter of the independent claims. Advantageous embodiments of the invention are subject-matters of the dependent claims.

According to one aspect of the invention, the possible handover to an entrusted non-3GPP network is prepared in advance as far as possible. In more detail, a mobile node which is currently located in a 3GPP or non-3GPP network access eventually needs to hand-off to another network access. Correspondingly, when a handover is becoming ever more likely, various different access networks may be available for hand-off, wherein the mobile node decides for one of the access networks during the actual handover. As already set out, for non-3GPP networks it is necessary to first discover an appropriate ePDG, as security gateway, and to then establish the corresponding tunnels to the ePDG to form the new data path; i.e. a security tunnel using IPsec between the mobile node and the ePDG, and an IP tunnel between the PON-gateway and the ePDG.

In order to prepare the handover to possible non-3GPP network accesses, the two tunnels are established, however maintained deactivated until their use is actually needed. In other words, tentative tunnels are created for the mobile node beforehand, which are only activated when the handover is actually due. The necessary tunnels for providing data between the UE in the future non-3GPP network and the other mobile node are to be prepared in advance, so that when actually handing over to the non-3GPP network, the IP session may be continued without any significant interruption by only activating the already established tunnels.

There may be several non-3GPP networks with various ePDGs; therefore, the security tunnel and IP tunnel are created for each and every possible ePDG. Later on, when one of same is selected by the mobile node for handover, the tentative tunnels created for the remaining non-selected ePDGs may be discarded or maintained for future use.

The invention provides a method for ensuring IP session continuity upon a handover of a mobile node from a source network to a non-3GPP network. The mobile node is first located in the source network and has an ongoing IP session via a packet data network gateway in the source network. Then, while the mobile node is attached to the source network, a tentative security association is established between the mobile node and a security gateway, wherein the security gateway provides for the source network a secure communication intermediary to the non-3GPP network. When performing the handover of the mobile node to the non-3GPP network, the tentative security association between the mobile node and the security gateway is updated by using the mobile node's local address in the non-3GPP network, for establishing a secure tunnel between the mobile node and the security gateway.

According to an advantageous embodiment of the invention, while the mobile node is attached to the source network, a tentative tunnel between the security gateway and the packet data network gateway is established. When performing the handover of the mobile node to the non-3GPP network, the tentative tunnel between the packet data network gateway and the security gateway is activated.

In a further embodiment of the invention, the security gateway is informed about the IP address of the mobile node, which is to be used for the establishment of the security association. This may be done implicitly or explicitly.

Regarding another embodiment of the invention the tentative security association is established between the security gateway and the mobile node using an address of the mobile node allocated when in the source network. The tentative security association is established by exchanging the address of the mobile node allocated when in the source network with a local address of the mobile node in the non-3GPP network.

For a different embodiment of the invention the step of establishing the tentative security association comprises detecting by the security gateway that the tentative security association is tentative based on an indication provided by the mobile node to the security gateway, or based on the mobile node's address being allocated when in the source network, or based on an inquiry to an authentication server, contacted by the security gateway during the establishment of the tentative security association.

According to a further embodiment of the invention, the step of establishing the tentative tunnel between the packet data network gateway and the security gateway comprises configuring by the security gateway a tentative binding cache entry at the packet data network gateway using the address of the security gateway, upon establishing the tentative security association.

According to an alternative embodiment of the invention, a general security gateway identification is provided to the mobile node during the step of establishing the tentative security association or the tentative tunnel. The tentative tunnel is activated by transmitting a message from the mobile node to the packet data network gateway comprising the general security gateway identification.

In another embodiment of the invention the tentative tunnel between the packet data network gateway and the security gateway is established by the security gateway and activated by the mobile node. The mobile node receives an authentication token, for later authorizing the mobile node to activate the tentative tunnel established by the security gateway.

Relating to another embodiment of the invention a plurality of non-3GPP networks are available for the handover of the mobile node, and at least one security gateway candidate is determined for the plurality of non-3GPP networks. A tentative security association is established between the mobile node and each determined security gateway candidate. A tentative tunnel is established between the packet data network gateway and each determined security gateway candidate. When performing the handover of the mobile node to a target non-3GPP network, the tentative security association is updated and the tentative tunnel established for the target security gateway of the target non-3GPP network is activated.

For a further embodiment of the invention, a tentative security association with each determined security gateway candidate is established by transmitting from each determined security gateway candidate to the mobile node information on access networks preferable for each determined security gateway candidate. Said information on access networks is used by the mobile node to determine the target security gateway among the security gateway candidates.

As an advantageous embodiment of the invention the mobile node establishes a second IP session via a second packet data network gateway. The second IP session is established by establishing a second tentative tunnel between the second packet data network gateway and the security gateway for the second IP session.

In an additional embodiment of the invention the second IP session is established by transmitting a general security gateway identification from the mobile node to the second packet data network gateway. The second tentative tunnel is established by the second packet data network gateway using the general security gateway identification.

For another embodiment of the invention the source network is a non-3GPP network and the ongoing IP session of the mobile node goes via a security gateway of the source non-3GPP network. After the handover of the mobile node to the target non-3GPP network a security association between the security gateway of the source non-3GPP network and the mobile node is updated by using the mobile node's home address for establishing a tentative state of said security association between the security gateway of the source non-3GPP network and the mobile node. A tunnel between the packet data network gateway and the security gateway of the source non-3GPP network used for the IP session is changed into a tentative state.

In an advantageous embodiment of the invention a direct interface is established between the security gateway and an entity in the source network. The tentative security association is established between the mobile node and the security gateway by communicating over the direct interface between the entity in the source network and the security gateway.

According to a further embodiment of the invention, the source network is a non-3GPP network, and the ongoing IP session of the mobile node goes via a further security gateway of the source non-3GPP network.

With regard to one embodiment of the invention, the entity in the source network is a mobility management entity. Furthermore, the mobility management entity learns the IP address of the security gateway by:
- a pre-configuration in the mobility management entity, or
- the mobile node transmitting the IP address of the security gateway to the mobility management entity, or
- by pre-configuring a particular security gateway in the mobility management entity, by transmitting messages received from the mobile node relating to the pre-establishment of the tentative security association from the mobility management entity to said pre-configured security gateway, and in case the pre-configured security gateway is not the security gateway with which the tentative security association is to be established, by the pre-configured security gateway transmitting the IP address of said intended security gateway to the mobility management entity, or
- by selecting an arbitrary security gateway, by transmitting messages received from the mobile node relating to the pre-establishment of the tentative security association from the mobility management entity to said arbitrary security gateway, and in case the arbitrary security gateway is not the security gateway with which the tentative security association is to be established, by the arbitrary security gateway transmitting the IP address of said intended security gateway to the mobility management entity.

The invention further provides a mobile node attached to a source network for ensuring IP session continuity upon a handover of the mobile node to a non-3GPP network. The mobile node has an ongoing IP session via a packet data network gateway in the source network. A receiver and a transmitter of the mobile node exchange messages with a security gateway for establishing a tentative security association between the mobile node and the security gateway, while the mobile node is attached to the source network. The security gateway provides for the source network a secure communication intermediary to the non-3GPP network. The receiver and transmitter of the mobile node further exchange messages with the security gateway for updating the tentative security association between the mobile node and the security gateway by using the mobile node's local address in the non-3GPP network for establishing a secure tunnel between the mobile node and the security gateway.

The invention also provides a security gateway for providing a secure communication intermediary to non-3GPP networks and for ensuring IP session continuity for a mobile node upon a handover from a source network to one of the non-3GPP networks. The mobile node is first located in the source network and has an ongoing IP session via a packet data network gateway in the source network. A receiver and transmitter of the security gateway exchange messages with the mobile node for establishing a tentative security association between the mobile node and the security gateway, while the mobile node is attached to the source network. The processor further activates the tentative security association between the mobile node and the security gateway by using the mobile node's local address in the non-3GPP network for establishing a secure tunnel between the mobile node and the security gateway.

The invention further provides a packet data network gateway in a source network to which a mobile node is attached for ensuring IP session continuity upon a handover of the mobile node to a non-3GPP network. The mobile node has an ongoing IP session via the packet data network gateway. A processor of the packet data network gateway establishes a tentative tunnel between the packet data network gateway and a security gateway, which provides for the source network a secure communication intermediary to the non-3GPP network, in response to the establishment of a tentative security association between the mobile node and the security gateway, while the mobile node is attached to the source network.

A receiver of the packet data network gateway receives a message from the mobile node for activating the tentative tunnel between the packet data network gateway and the security gateway, when the mobile node performs the handover to the non-3GPP network. The processor activates the tentative tunnel between the packet data network gateway and the security gateway in response to the received message.

BRIEF DESCRIPTION OF THE FIGURES

In the following the invention is described in more detail with reference to the attached figures and drawings. Similar or corresponding details in the figures are marked with the same reference numerals.

DETAILED DESCRIPTION

Definitions

Figure 1:
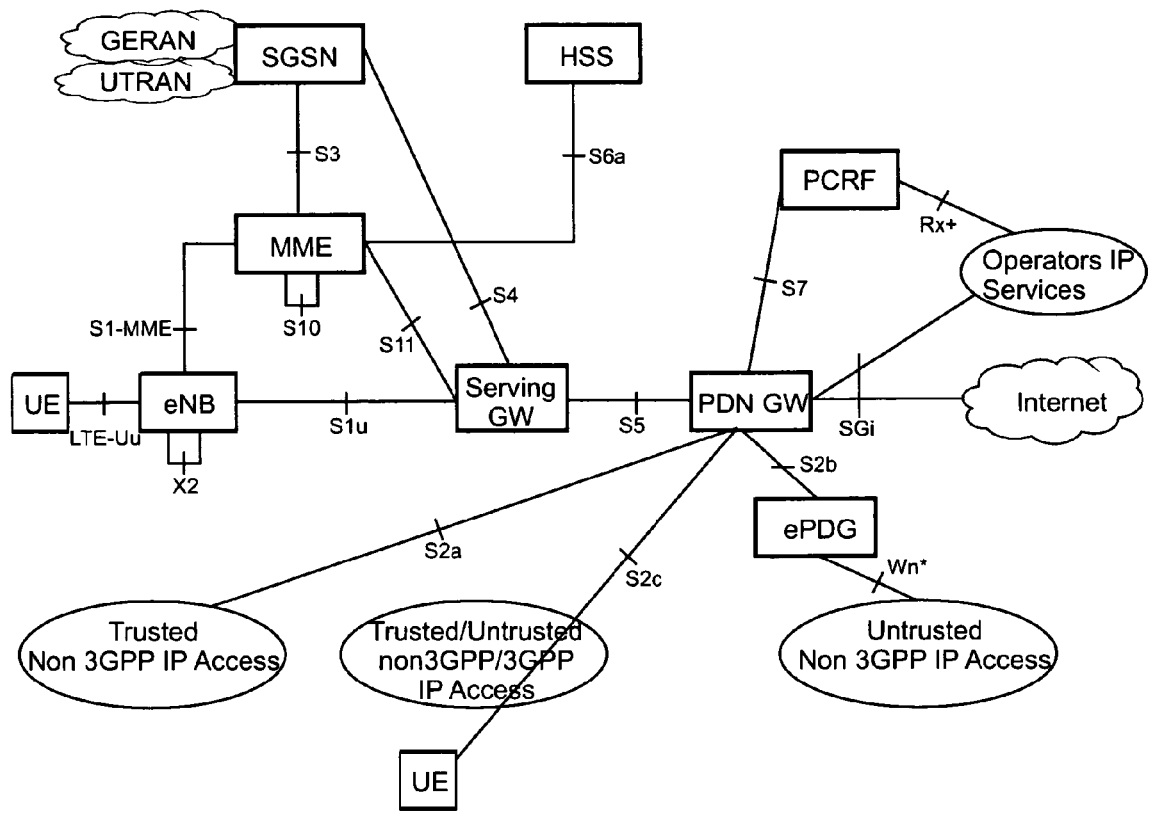
FIG. 1 illustrates the high-level architecture of an LTE system.
Figure 2:
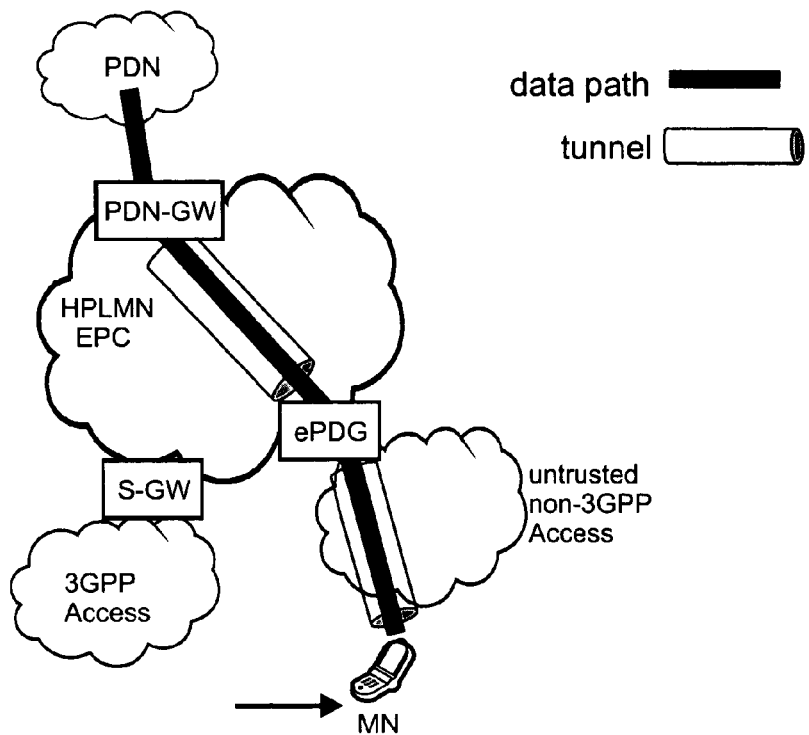
FIG. 2 shows a network deployment in which the mobile node has performed a handover to an untrusted non-3GPP network access, communicating via a security gateway with the 3GPP core network.
Figure 3:
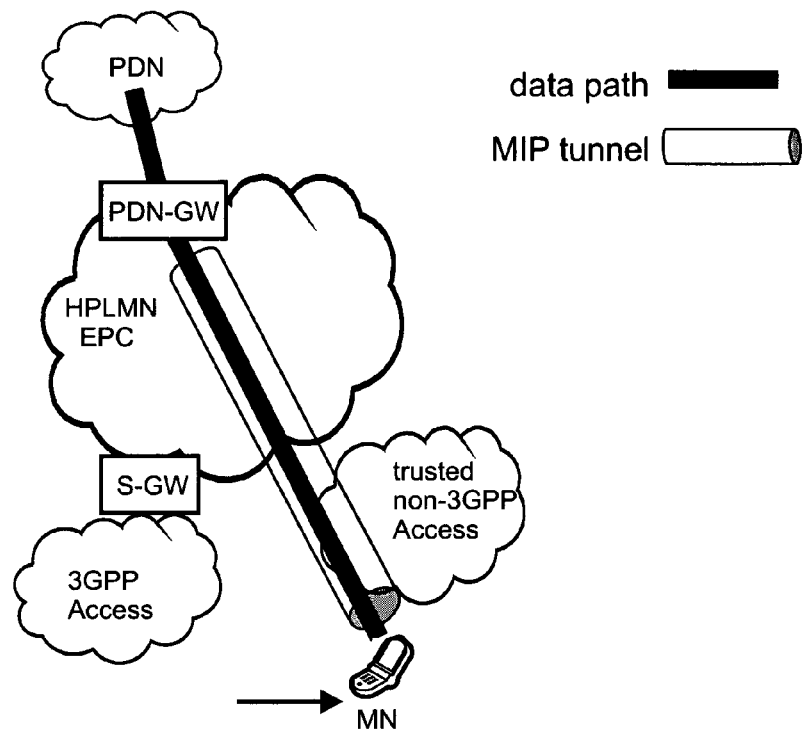
FIG. 3 illustrates a network deployment in which the mobile node has performed a handover to a trusted 3GPP network access, wherein the mobile node may communicate directly with the 3GPP core network.

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

A 3GPP system is a communication system standardised by the 3GPP consisting of a 3GPP core network and a 3GPP radio access network.

A 3GPP core network is related to the part of the 3GPP system which consists of physical entities that are independent of the connection technology of the terminal (e.g. radio, wired).

A 3GPP access network is related to the part of the 3GPP system which consists of entities dependent on the 3GPP radio access technology, e.g. the base station.

A non-3GPP access network is a communication system consisting of entities providing nodes connectivity to a network independent from a 3GPP system. A security association (SA) may be defined as a set of security information that two nodes or functional entities share in order to support secure communication. For example, a security association may include a data encryption algorithm, data encryption key(s) (e.g. a secret key or a public/private key pair, initialization vector(s), digital certificates, etc.). Typically, there is a security association provided between a mobile node in a foreign network and its home agent in the home network. Thus, even if the mobile node is attached to a foreign network, encrypted and/or authenticated/authorized communication between the home agent and the mobile node (e.g. through a secured tunnel) may be ensured. The security association is typically bound to the addresses of the endpoints, i.e. to the home agent address and the one of the mobile node's addresses (typically the home address).

Tentative is an adjective used in this invention mainly for describing a state of a tunnel. A tentative tunnel is established however not yet "activated". Consequently, the endpoint entities of the tentative tunnel have established all necessary parameters (e.g. Binding-Cache-Entry) for the tentative tunnel, however do not use the tunnel for any data forwarding. Nor are any reactions carried out for a tentative tunnel which would be conducted in case a non-tentative tunnel is established. Correspondingly, an actual tunnel can be established in a fast way by only activating the tentative tunnel, since the necessary steps have been already performed beforehand.

Furthermore, the adjective "tentative" is also used for describing an IPsec security association/tunnel. In said case, a IPsec security association may be active, though it is still tentative. In more detail, a tentative IPsec SA/tunnel need not be deactivated since no data would be transmitted anyway over said communication link. According to later scenarios of the invention, a tentative IPsec tunnel would be provided between the ePDG2 and the UE. Since no data is received in ePDG2 for the UE, no data would be forwarded over said IPsec tunnel.

In the invention it will be differentiated between an IKE security association and an IPsec SA/tunnel. The IKE SA is merely used to negotiate shared keys between the communication partners. These shared keys are then used in the negotiation for the IPsec SA. Furthermore, the IPsec SA defines the communication partners, and which packets are to be transmitted to which IP address, and the encryption used for the transmission of said packets etc. Therefore, the IPsec SA may as well be referred to as an IPsec tunnel, whereas IKE SA is only necessary for exchanging keys.

The following paragraphs will describe various examples and embodiments of the invention. These examples and embodiments should not be understood as limiting the invention, but rather as giving the skilled person the possibility to understand the principles of the invention. Not-mentioned variations of the principles are encompassed within said principles and are obvious to a skilled person when studying this description.

Figure 4A:
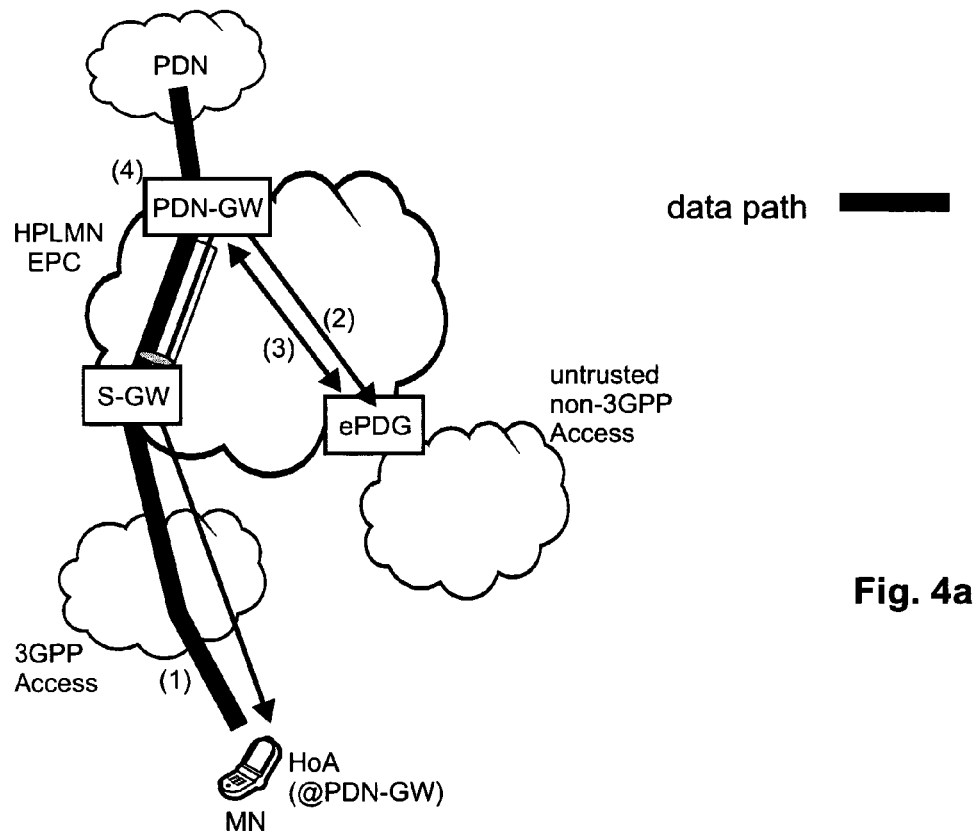
FIG. 4a shows a network deployment and message exchange according to one embodiment of the invention, where the UE is located in the source network and prepares the handover to the target non-3GPP access network.

FIG. 4a illustrates the starting position in an exemplary embodiment of the invention, in which the mobile node is located in a 3GPP access network and has an ongoing IP session with e.g. another mobile node. The IP session communication is achieved via the 3GPP access network, a Serving-Gateway of the 3GPP access, a PDN-GW in the evolved Packet core network and via the Packet data network (1). Proxy-Mobile IP is used, wherein the PDN-GW is the home agent of the mobile; the UE's Home Address is allocated at the PDN-GW, and the PDN-GW tunnels data packets from the PDN to the UE using a Care-of address. As apparent from FIG. 4a, the PMIP tunnel is established between the PDN-GW and the S-GW, since with Proxy-MIP the S-GW is the mobility anchor for mobility within the 3GPP access network, for instance when changing the eNode-Bs. Here the Care-of address is an IP address of the S-GW.

It is assumed that only one untrusted non-3GPP network access would be available for the handover of the mobile node. Of course this is a mere example to facilitate the explanation of the various principles of the invention, and more than one network access, be it 3GPP or non-3GPP or trusted/untrusted, is possible as well.

In the following, one specific embodiment of the invention will be discussed. The embodiments of the invention shall prepare at the forefront all possible data paths which could be needed after the handover. In particular, after a handover to a non-3GPP access network, the data path would be changed since the UE needs to communicate via an ePDG with the PDN-GW. By establishing the data paths in advance, however maintaining them in a tentative state, it is possible to expedite the handover to said non-3GPP access network.

First, sometime before the handover would take place, the UE needs to discover the possible ePDG, i.e. the IP addresses of the ePDGs. In said case, it is assumed that the one untrusted non-3GPP network access can be served by several ePDGs, however only one is to be selected by the mobile when eventually performing the handover to said non-3GPP network access.

The detection of the various ePDGs can be conducted in a usual way. For instance, the mobile node may use pre-configured information or the DNS (Domain Name System) system. With regard to pre-configured information, the mobile node may have a list of ePDG IP addresses stored on a smart card (USIM) that should be used from a specific non-3GPP access. For example, if the non-3GPP access is a WLAN access network, the mobile node uses the SSID (Service Set Identifier) broadcasted by the network and performs a lookup in the table to determine the ePDG to be used. On the other hand, when DNS is used, the mobile constructs a FQDN (Fully Qualified Domain Name) using for example some information from the non-3GPP access and/or operator identities of the PLMN (Public Land Mobile Network) and performs a DNS query to resolve it. The DNS response will contain one or more IP addresses of equivalent ePDGs the mobile node can connect to.

Then, after the UE knows the IP address of an ePDG, it uses its own IP address (MN's home address) assigned by the PDN-GW and IKEv2 to establish a tentative secure tunnel (IPsec) to the ePDG (2). Since the mobile node is still at the 3GPP access network, and the address used for IKEv2 is the home address allocated at the PDN-GW, said IPsec tunnel would go via the S-GW and the PDN-GW to the ePDG. However, as can be seen from FIGS. 4a and 4b, the tentative IPsec tunnel also goes via the PDN. The reason is that the PDN-GW is configured to route all traffic sent by a mobile node to an IP network and this is the PDN. The PDN can be for example the public internet, a corporate network or an intra operator network (for provisioning of IMS(IP Multimedia Subsystem) services). Furthermore, the IP address of the ePDG used by the mobile node is an address of the external interface of the ePDG.

Consequently, instead of using an internal interface of the ePDG provided for communication within the core network, the tentative IPsec tunnel would thus use an external interface to the ePDG, and thus a different ePDG IP address (this will be discussed in more detail later. In various Figures in this invention, the tentative IPsec tunnel is depicted as crossing the core network; however, this is only for reasons of better illustration and does not necessarily coincide with the technical implementation in which the tentative IPsec tunnel contacts the external ePDG interface from the PDN.

Generally, IPsec provides security services at the IP layer for other protocols and applications in order for them to communicate securely. That is, IPsec sets up a secure path between two communicating nodes over insecure intermediate systems. In this respect, IPsec is composed of several components to provide security service, wherein the two main ones are the Authentication Header (AH) protocol and the Encapsulating Security Payload (ESP) protocol. They provide authenticity and privacy to IP data by adding particular headers to the IP data packet. The Internet Key Exchange (IKE) is the protocol used to set up a security association (SA) in the IPsec protocol suite. IKE uses a Diffie-Hellman key exchange to set up a shared session secret, from which cryptographic keys are derived. Public key techniques or, alternatively, a pre-shared key, are used to mutually authenticate the communicating parties. IPsec Security Associations are logical connections between the two communication partners, i.e. in the invention mainly between the UE and the ePDG, and all traffic traversing the IPsec SA is provided the same security processing, e.g. integrity protection and encryption.

Though in the previous and further embodiments it is described that a tentative IPsec tunnel is pre-established, this should not necessarily be construed as comprising the assigning of resources to the IPsec tunnel. Instead, the pre-establishment of a tentative IPsec tunnel may also be understood as only comprising the negotiation of the IKE security association, which consumes the greatest part of the IPsec tunnel establishment. Therefore, according to the invention, it is possible to only pre-establish the security association between the UE and ePDG, or the actual IPsec tunnel may be tentatively established including the resource reservation and allocation.

However, it is important that the establishment of the IPsec tunnel between the UE and the ePDG is only tentative, i.e. the just-established IPsec tunnel between the UE and the ePDG is not to be used but shall rather remain idle until it is eventually needed.

For instance, according to the system architecture for accessing non-3GPP networks, in case Proxy MIP is used between the PDN-GW and the ePDG, the establishment of the IPsec tunnel between the UE and the ePDG would trigger the ePDG to transmit a Proxy Binding Update message to the PDN-GW and thus switching the traffic to the ePDG, instead of continuing transmitting the traffic via the 3GPP network to the UE. Since the UE is actually still in the 3GPP access network, this switching would be detrimental since this would lead to data loss and IP session interruption.

In order to establish the IPsec tunnel in the tentative state, within the tunnel establishment the UE may inform the ePDG that this tunnel is only a pre-establishment of a tunnel to be used later after handover. For example, any message of the IKE exchange for establishing the security association may be adapted to carry a flag or similar, from which the ePDG derives that the IPsec tunnel is merely tentative.

Alternatively, the ePDG may detect implicitly that the IPsec tunnel is only a pre-established tunnel, because the IP address used by the UE in the IKEv2 exchange is the home address of the UE. In particular, if the UE would have indeed performed the handover, the IKEv2 message exchange would have been performed with a local address in the non-3GPP access network, but not with the home address of the MN.

Another possibility for the ePDG to detect the pre-establishment of the tentative IPsec tunnel could be via AAA (authentication, authorization and accounting) exchange. When the UE establishes the tunnel to the ePDG, mutual authentication between the UE and the network is performed based on EAP-AKA (Extensible Authentication Protocol Method for UMTS Authentication and Key Agreement). In said case, the ePDG is the AAA client that contacts the AAA server for authentication of the UE. During the authentication procedure the AAA server may detect that the UE is still in an access that does not require the ePDG. Thus, there is no need to use the secure tunnel to the ePDG for data traffic yet, and the AAA server informs the ePDG about that.

As apparent, there are various ways that the ePDG may derive that the IPsec tunnel is only a tentative one, i.e. that the UE has not performed the handover yet. A skilled person is able to think of further possibilities for achieving said purpose.

Furthermore, the PMIP tunnel from the PDN-GW to the ePDG can be established in advance. Accordingly, in response to the IPsec tunnel establishment, the ePDG transmits a Proxy Binding Update (PBU) message to the PDN-GW for triggering same to establish a tentative PMIP tunnel to the ePDG without effecting the path switch in the PDN-GW. The PMIP tunnel between the PDN-GW and the ePDG shall be tentative as well, i.e. not being used yet. For example by enhancements of PMIP signalling (3), a tentative state (4) of the PMIP tunnel could be crerated in the PDN-GW. For instance, PMIP could be enhanced by addition of a new flag in the PBU that indicates the tunnel pre-establishment. The tentative PMIP tunnel pre-establishment could for example comprise the IP address of the ePDG as tentative Binding Cache Entry as well as security, tunnel and QoS parameters.

Consequently, while the UE is in the source network, the previous steps are performed so as to establish the two tentative tunnels, i.e. the secure tunnel between the UE and the ePDG, and subsequently the PMIP tunnel between the PDN-GW and the ePDG. Both are to be in a tentative state, since the UE is still in the source network, and those tentative tunnels are only to be used in case the UE actually performs the handover to said non-3GPP access network.

Instead of pre-establishing before the handover a tentative PMIP tunnel between the ePDG and the PDN-GW, the ePDG may only create the states for the IPsec tunnel between the UE and the ePDG during the IKE/IPsec tunnel pre-establishment. Thus, no signaling is performed by the ePDG to the PDN-GW at that time. Rather, the PMIP tunnel between the ePDG and the PDN-GW is established during the handover of the UE to the untrusted non-3GPP access. In other words, according to this alternative embodiment of the invention, only the tentative IPsec tunnel between the UE and the ePDG is created beforehand.

Figure 4B:
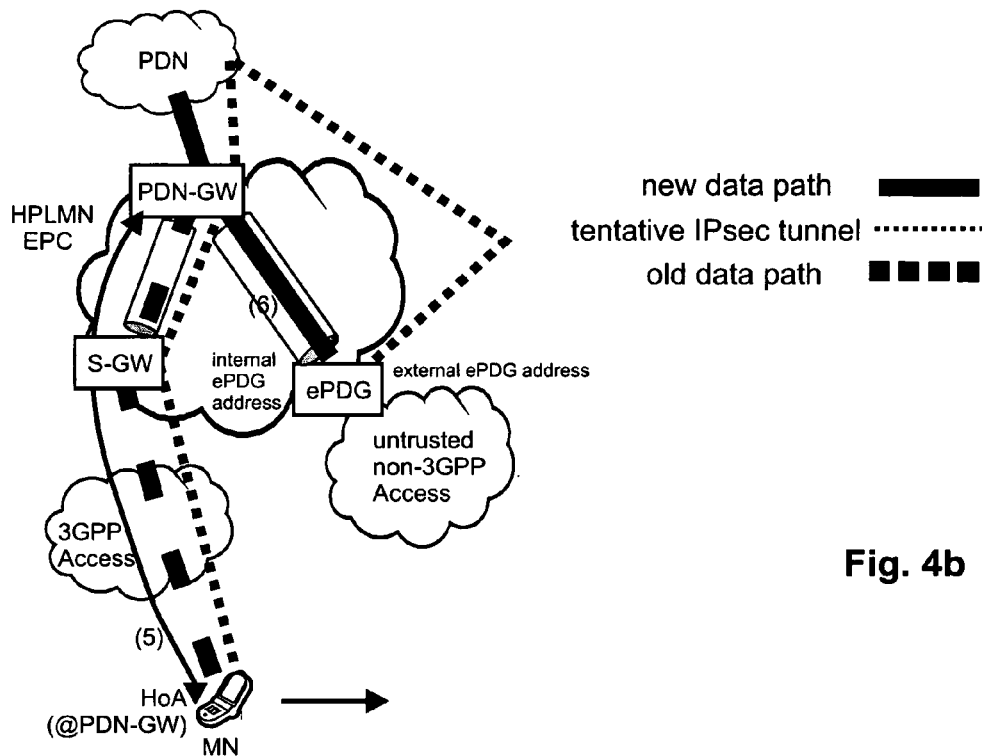
FIG. 4b illustrates a network deployment and message exchange according to the embodiment of the invention, where the UE is performing the handover to the target non-3GPP access network.

FIG. 4b shows the network deployment and message exchange when the MN performs the handover to the untrusted non-3GPP network. Later on, when the UE is actually starting the handover, but still in the source network, the UE informs the PDN-GW (5) of the ID of the ePDG to be used after the handover and to switch the path of the data traffic to the ePDG (6), i.e. activate the tentative state of the PMIP tunnel (in case no tentative PMIP tunnel has been established, a new state for a PMIP tunnel is created). This path switch trigger can be initiated by the UE over any connection, for example over 3GPP access specific procedures directly (i.e. via Non-Access Stratum (NAS) signalling to the MME), to ensure minimal delay, and needs not to be performed via the pre-established ePDG connection.

After the L2 handover is completed, it is necessary to activate the tentative IPsec tunnel between the UE and the ePDG, so that the new data path from the PDN-GW to the UE can be used. Furthermore, it is necessary to update the IPsec tunnel with the UE's new local address (7), which was assigned to the UE during the handover to the new untrusted non-3GPP network area by the access point to which the UE attached.

To said end, an extension to protocols is used so that the individual addresses to which an established security association is bound may be updated, One possible solution may be to send a message containing the new address to which the security association is bound to the respective other peer (i.e. the ePDG). This signalling message may for example be protected by the security association. The signaling message(s) for updating the addresses bound to a security association may be designed similar to the messages as for example defined in Eronen, "IKEv2 Mobility and Multihoming Protocol (MOBIKE)", IETF RFC 4555, June 2006 (available at http://www.ietf.org and incorporated herein by reference) or similar to the messages for establishing a new security association (see e.g. Haley et al., "Mobility Header Home Agent Switch Message", IETF Internet Draft, draft-ietf-mip6-ha-switch-00. txt, June 2006).

Figure 4C:
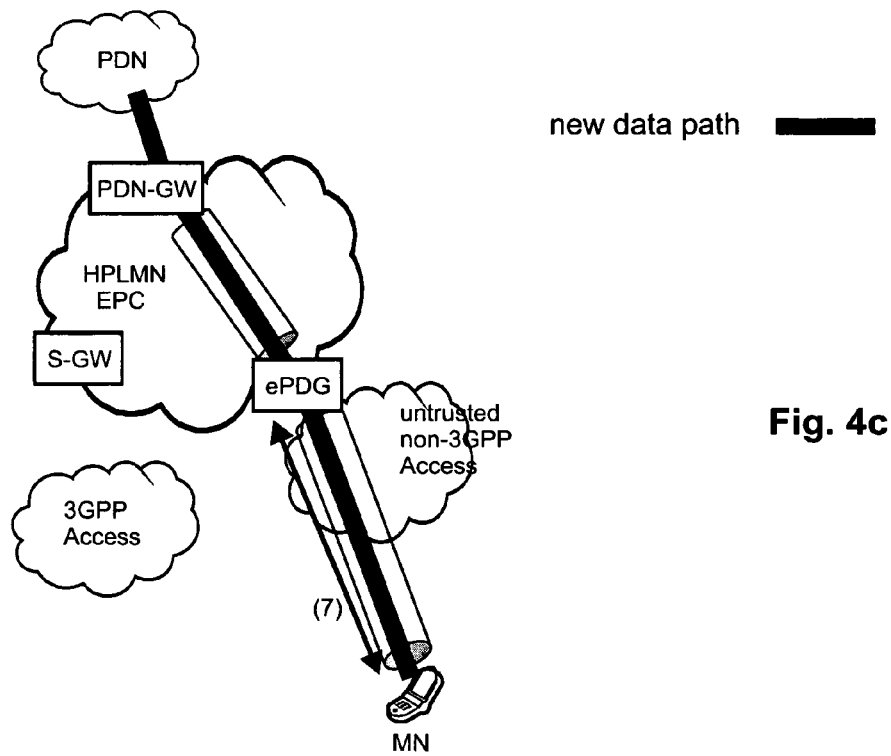
FIG. 4c shows a network deployment and message exchange according to the embodiment of the invention, where the UE is attached to the target non-3GPP access network.

This is illustrated in FIG. 4c, showing the network deployment when the UE has already attached to the new non-3GPP access network.

After having activated and updated the tentative iPsec tunnel between the UE and the ePDG, the handover of the UE to the non-3GPP network is finished, and the IP session data is transferred over the new data path. The optimized handover procedure produces a shorter delay, since the handover was prepared beforehand, i.e. the necessary tunnels were already established, albeit not yet activated. Thus, when performing the handover, it suffices to activate the tentative tunnels, which can be done faster than to establish the tunnels from scratch.

In the following, various aspects of the above discussed embodiment of the invention will be described in more detail.

In the previous embodiments of the invention, it has been assumed that Proxy MIP is used by the network. However, the principles of the invention also apply to scenarios in which Client-Mobile IP is used, though with a small change. In particular, when using Client MIP, the UE is connected to its Home Agent, the PDN-GW via a CMIP tunnel, whereas with Proxy-MIP the UE is not directly connected to the Home Agent, i.e. the Local Mobililty Agent (LMA), but only to the ePDG, i.e. the MAG. Therefore the PMIP tunnel from the PDN-GW only reaches to the ePDG. Consequently, in case the UE uses Client MIP, the MIP tunnel would go from the PDN-GW (UE's HA) to the UE, instead of going from the PDN-GW to the ePDG (UE's MAG) when employing Proxy-MIR Between the ePDG and the UE, the Client-MIP tunnel would be inside the iPsec tunnel; in other words, the data packets are first encapsulated in the PDN-GW according to Client-MIP, then the data packets are further encapsulated as a whole according to IPsec. Though the previous and following embodiments of the invention will be limited to Proxy MIP, a skilled person is able to apply the teachings disclosed herein to a Client-MIP case without difficulties.

In addition, when the UE activates in the PDN-GW the tentative PMIP tunnel (or creates a new state for a PMIP tunnel) to the ePDG (step (6) in FIG. 4b), one problem is how the UE may identify the ePDG to the PDN-GW, because, when the UE establishes the connection with the ePDG for the IPsec tunnel, it uses the external IP address of the ePDG, as can be appreciated from the FIG. 4b in which the IPsec tunnel coming from the PDN arrives at the external interface of the ePDG. However, the tunnel between the PDN-GW and the ePDG may be based on an internal IP address, different from the external one (see e.g. also FIG. 4b). Thus, when the UE is to indicate the ePDG to the PDN-GW, the PDN-GW would need to notify the internal IP address of the ePDG, instead of the external one.

In order to solve this issue, one possibility is that the PDN-GW or ePDG may provide a common ID for the ePDG, i.e. an ePDG-ID, to the UE during pre-establishment of the IPsec tunnel (2). Then, the UE uses the ePDG-ID to inform the PDN-GW about the ePDG to be used for the PDN-GW to know which tentative tunne is to be activated (or to which ePDG a PMIP tunnel is to be created). Thus, one common ePDG identifier is used, from which both entities, the UE and the PDN-GW may derive the appropriate IP address of the ePDG, independent from the interface which is to be used to contact the ePDG.

Another problem encountered in the above discussed embodiment of the invention illustrated in FIG. 4, is that in case a tentativ PIMP tunnel has been created between the ePDG and the PDN-GW, the tentative state of the PMIP tunnel is established by the ePDG (step (3)) but the state is later activated by the UE (step (5)); or in case no tentative tunnel between the ePDG and the PDN-GW has been created, the PMIP tunnel establishment in the PDN-GW is triggered by the UE, but the tunnel is actually between PDN-GW and ePDG. Thus, the PDN-GW must ensure that the entity that triggers the activation is authorized to do so. To said end, an authentication token may be generated during the pre-establishment of the PMIP tunnel or the IPsec tunnel between the UE and the ePDG, which is then provided to the UE. Said authentication token is then transmitted together with the activation of the PMIP tunnel, so that the PDN-GW accepts the activation and performs the necessary steps. Advantageously, the ePDG-ID may also comprise said authentication token that is generated during the pre-establishment and that can be only known to the PDN-GW, ePDG and UE.

The above-mentioned steps of the embodiment to prepare the handover to a non-3GPP network while the UE is still in the source network may be conducted anytime before the handover. Since the ongoing IP sessions may change significantly while in one network, advantageously, the steps should be performed only when a handover is to be expected. In order to determine whether a handover is getting more likely, there are several possibilities. For instance, whether a non-3GPP access is everywhere available in the vicinity of the current location or not can be determined by using neighbour graphs showing the deployment of the non-3GPP/3GPP access networks. Or if non-3GPP access is everywhere available in the movement direction of the mobile terminal or not.

The current access, be it non-3GPP or 3GPP, might also inform the mobile node about a neighbour non-3GPP access cell list, and if the number of neighbour cells decreases, the mobile terminal may start the pre-establishment of tentative tunnels for its ongoing IP sessions.

Alternatively to the above, the mobile node may start to pre-establish the tentative tunnels if the signal strength of the current access base station decreases and the signal strength of no other base station of the current access network starts to increase.

Another possibility to determine the likelihood of a handover to a non-3GPP network is when the mobile terminal stores its own movement patterns and therefore learns whether non-3GPP access coverage is available or not. In particular, the mobile terminal can detect whether its current movement matches to any stored pattern, and based on the stored moving pattern, the mobile terminal knows at what point a handover to a non-3GPP access has occurred in the past, and thus it can decide when to start pre-establishing the tentative tunnels for its ongoing IP sessions.

Moreover, the foregoing embodiment of the invention assumes that only one untrusted non-3GPP network is available for the UE handover and also assumes that only one ePDG is available to be selected by the UE. However, it may well be that there is only one untrusted non-3GPP network but several ePDGs that may serve said non-3GPP network. Similarly, there might be several non-3GPP networks (and possibly also 3GPP networks) available for handover, and for each of said non-3GPP networks there might be one or more ePDGs that may serve them. In any case, there might be several ePDG candidates for a future handover. According to a further embodiment of the invention, an IPsec tunnel (IKE security association) between the UE and each ePDG is pre-established, and a PMIP tunnel between the PDN-GW and each ePDG may be pre-established. Then, shortly before the handover, the UE selects one of the plurality of non-3GPP networks and correspondingly selects one of the ePDG candidates that serves said selected non-3GPP network. Accordingly, only the tentative PMIP tunnel and IPsec tunnel for said selected ePDG are activated and updated appropriately to form the new data path. After finishing the handover, the UE is thus able to quickly resume the IP session, without any significant interruption by the handover. As just explained, in case several ePDG candidates are available for a possible handover, a tentative PMIP tunnel may be and a tentative IPsec tunnel is pre-established for each ePDG candidate. However, after choosing one of the ePDG candidates, the remaining tentative tunnels are no longer necessary. Therefore, the tentative tunnels for the remaining ePDG may either be broken down or maintained for future use. Accordingly, in addition to indicating to the PDN-GW the selected ePDG, the UE may also indicate to the PDN-GW which tentative entry for the PMIP tunnels may be removed or be kept for future use. Similarly, the other ePDG candidates may be contacted to delete the security association established with the UE, or may keep said security association for a predetermined time.

One further embodiment of the invention suggests that during the IPsec tunnel pre-establishment the ePDG may inform the UE about access networks and related information that are preferable from this ePDG. With this information, the selection of the best ePDG from the new non-3GPP access network can be optimized.

Figure 5A:
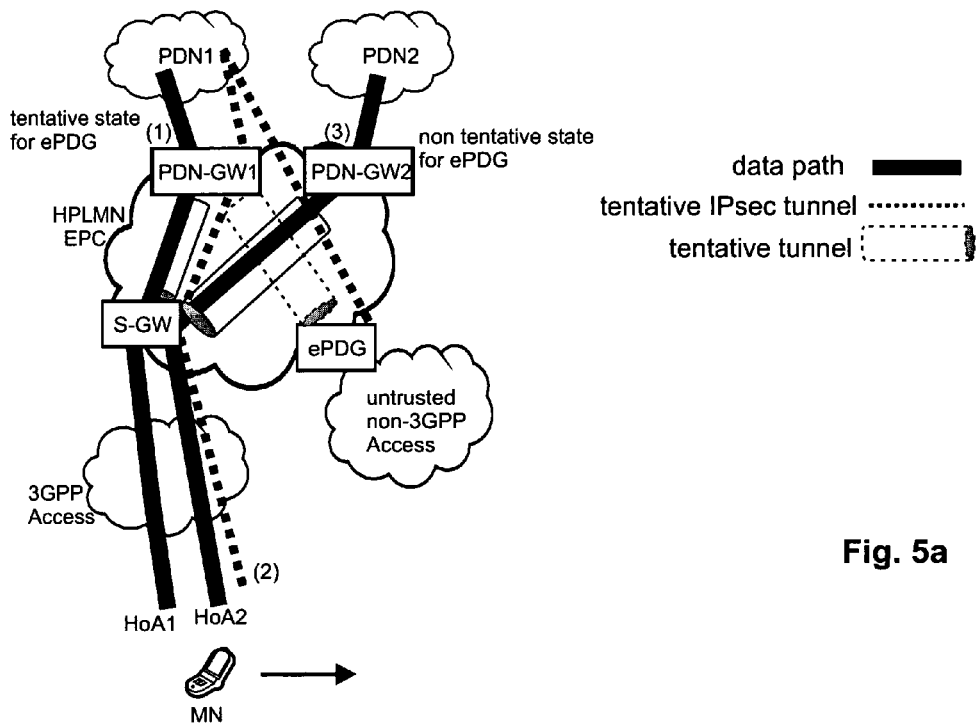
FIG. 5a shows a network deployment and message exchange in which the UE has two ongoing IP sessions via two PDN-GWs, wherein a tentative security tunnel and tentative tunnel have been pre-established for the first IP session.

In the previous embodiments it has been assumed that the UE has connectivity to only one Packet Data Network (PDN) via one PDN-GW. However, the UE may have connectivity to multiple PDNs simultaneously, i.e. for example a connection to an Internet PDN for web-browsing and a connection to a corporate network PDN for accessing corporate emails, thereby using multiple PDN-GWs, as can be seen in FIG. 5a. Naturally, after handover the various ongoing IP sessions are to be maintained, and thus appropriate new data paths are to be established in said respect.

To said end, the above-discussed embodiment of the invention can be adapted to pre-establish two tentative IPsec tunnels between the UE and ePDG respectively one for PDN-GW1 and PDN-GW2 using the two Home Addresses assigned by the two PDN-GWs. Subsequently, the ePDG would trigger the two PDN-GWs to establish a tentative PMIP tunnel to the ePDG. Accordingly, when performing the handover, the UE needs to contact each PDN-GW in order to activate the respective tentative PMIP tunnels to the ePDG. Furthermore, the MOBIKE protocol can be used after handover, to update the two IPsec tunnels with the new local IP address assigned to the UE in the non-3GPP access network. Consequently, two separate data paths would have been pre-established and then activated for use after the handover; one for each ongoing IP session.

However, in the above example two tentative IPsec tunnels are established and then activated when handing over. According to the following embodiment of the invention only one (tentative) IPsec tunnel is necessary for both IP sessions. In case a single IPsec tunnel shall be used, the UE may include the APNs of both PDN-GWs during the tunnel establishment, i.e. in the Dr payload of the IKE_AUTH message, the APNs separated by a specific delimiter symbol. Based on the APNs, the ePDG finds out that connections to two PDN-GWs are needed. Further, the UE should include in the IKE_AUTH a configuration payload (CFG_REQUEST) with two Configuration Attributes requesting for two internal addresses in order to get both corresponding home addresses. Therefore, network/air resources are saved by re-using the IPsec tunnel.

However, it may be that one of the PDN connections may be established per default, shortly after switching on the UE, and the other one may be established by user interaction at some later point in time. In said case, with this multiple PDN connectivity the following scenario is possible as can be seen in FIG. 5a. The UE is active in the 3GPP access network and has a connection to a PDN-GW1 (1), using a first Home Address HoA1 assigned by PDN-GW1. Furthermore, the UE has pre-established a tentative PMIP tunnel between the PDN-GW1 and an ePDG (2) in addition to the tentative IPsec tunnel between the ePDG and the UE. Then, the UE establishes an additional PDN connection with a different PDN-GW2 (3) using a second Home Address HoA2 assigned by PDN-GW2.

Figure 5B:
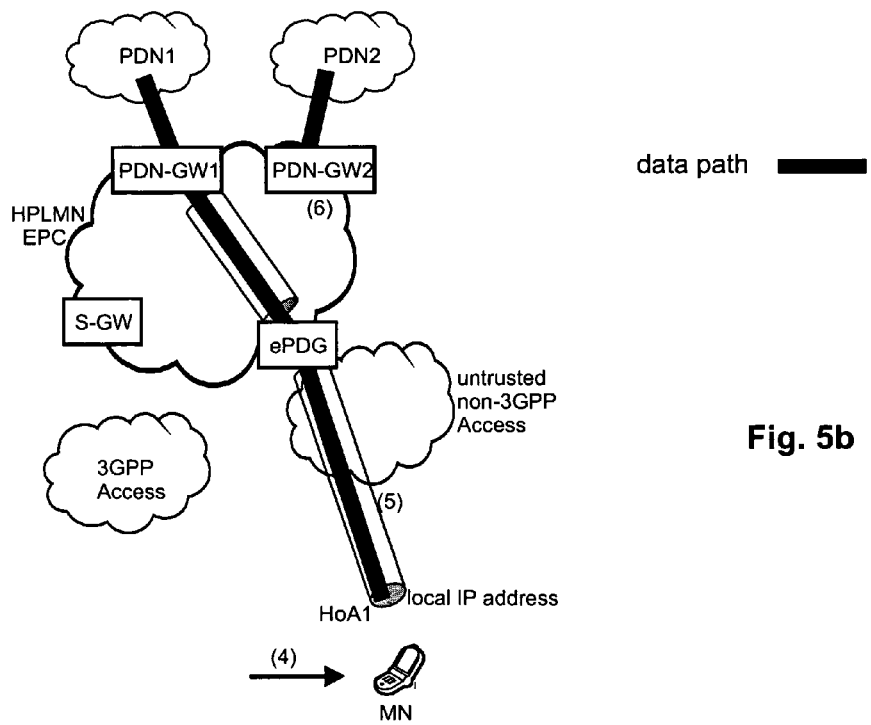
FIG. 5b shows the network deployment of FIG. 5a when the UE has performed the handover to the non-3GPP access network, and the inventive optimization of the handover can only be applied to the first IP session.

FIG. 5b shows the network deployment when the UE has attached to the new non-3GPP network. Correspondingly, when handing over to the untrusted non-3GPP access (4), the UE activates the tentative IPsec tunnel to the ePDG and updates same using e.g. MOBIKE with the UE's local IP address (5). Since the second IP session via PDN-GW2 has been established after the pre-establishment of the tunnels for the first IP session is performed, no tentative tunnels have been set up for PDN-GW2. In this case, there is the problem that the ePDG is not aware of the session established later to PDN-GW2, and therefore the PMIP tunnel from PDN-GW2 to the selected ePDG and the IPsec tunnel between UE and ePDG are to be set up during handover as usual, thereby delaying the handover (6).

Figure 6:
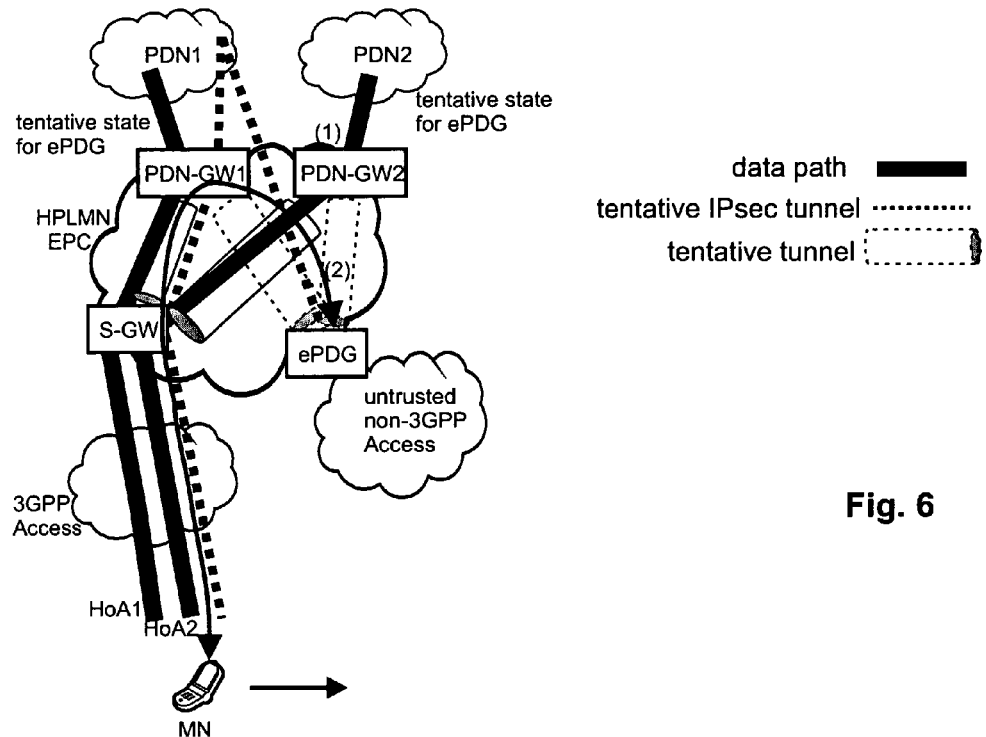
FIG. 6 illustrates the network deployment and message exchange according to another embodiment of the invention, in which, when a new IP session is set up, the pre-establishment of the tentative tunnels for all ongoing IP-session is re-initiated to encompass the new IP session as well.

In FIG. 6 a further embodiment of the invention is disclosed to solve the problems discussed with reference to FIGS. 5a and 5b, namely when a further IP session is set up after the pre-establishment for a first IP session is already completed. According to this embodiment of the invention, as soon as the second IP session is set up, the UE re-initiates the inventive pre-establishment procedure with the ePDG and signals connectivity with PDN-GW1 and PDN-GW2 (2). Thus, this embodiment of the invention can be compared to the previous-discussed case where the two IP sessions are already set up from the beginning, and the pre-establishment is performed with both PDN-GWs at the same time. Therefore, in response to establishing one or two tentative IPsec tunnels between the UE and the ePDG, respectively using only one Home Address or the two Home Addresses HoA1 and HoA2, the ePDG instructs the two PDN-GWs to respectively set up a tentative PMIP tunnel to the ePDG. The tentative tunnels for the first IP session and for the second IP session are then activated and updated during and after the handover so as to establish the new data paths to the new non-3GPP access network. However, this procedure increases the signalling over the air, since the pre-establishment for the first IP session is conducted twice.

Figure 7:
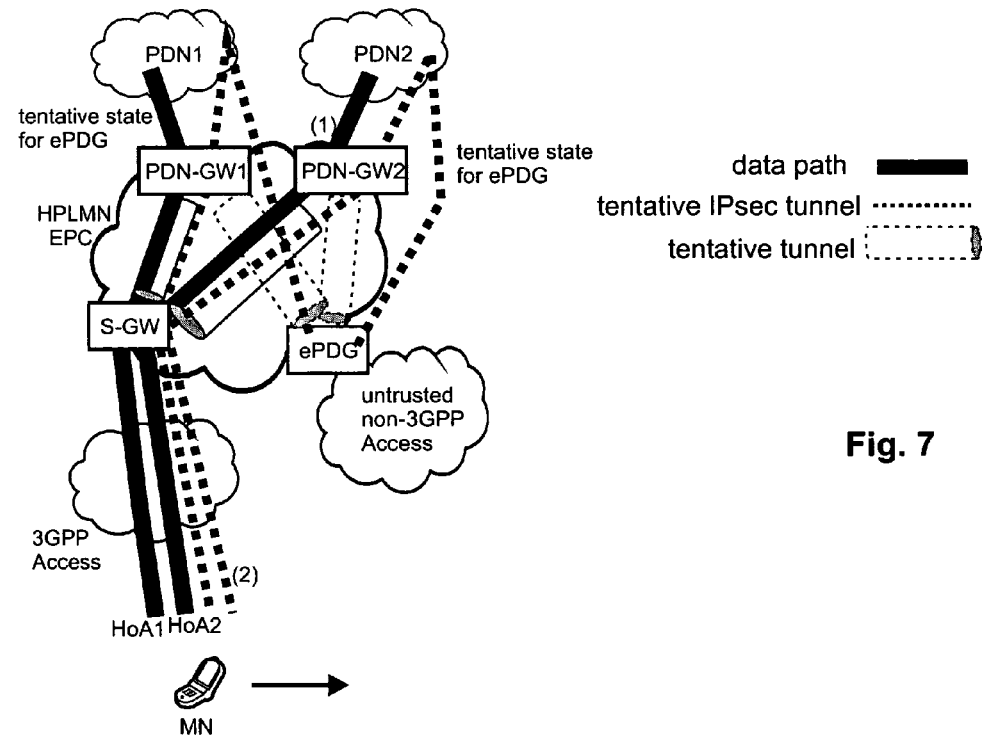
FIG. 7 shows the network deployment and message exchange according to another embodiment of the invention, in which, when a new IP session is set up, the pre-establishment of the tentative tunnels for only the new IP session is initiated, FIG. 8a/b show the network deployment and message exchange according to still another embodiment of the invention, where during the establishment of a new IP session the tentative tunnel between the new PDN-GW2 and the ePDG is established, and the tentative IPsec tunnel for previous IP sessions can be reused for the new IP session.

Another solution to said problem is depicted in FIG. 7 according to a different embodiment of the invention. The difference to the first solution of FIG. 6 is that instead of pre-establishing the tentative tunnels for both IP sessions, the pre-establishment is performed only for the second IP session, while maintaining the tentative tunnels already established for the first IP session. According to said second alternative, after establishment of the additional PDN connection (1), the UE pre-establishes another tentative IPsec tunnel with the ePDG, this time using MN's HoA2 via PDN-GW2 (2). In response thereto, the ePDG would then trigger the PDN-GW2 to establish a tentative PIMP tunnel to the ePDG. During and after the handover, all four tentative tunnels established for the two IP sessions can be activated and updated for setting up the data paths for use in the new non-3GPP access network. However, this still maintains the disadvantage of having a higher resource consumption in the UE and ePDG due to the establishment of the additional IPsec tunnel for the second IP session.

Figure 8A:
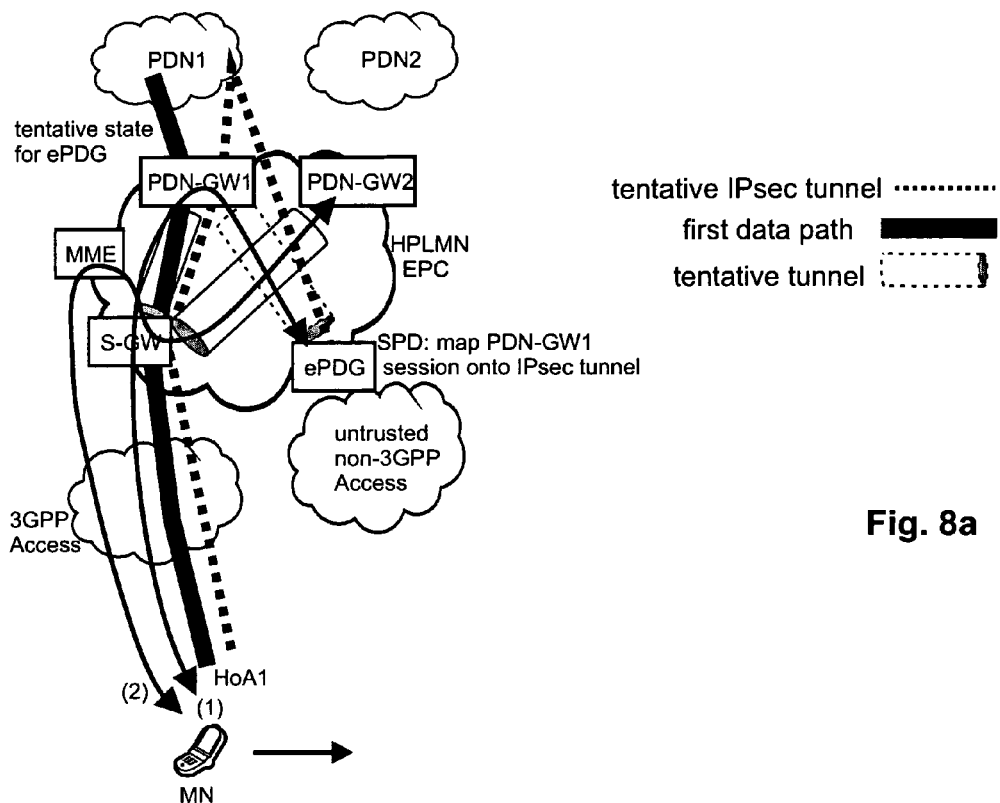
Figure 8B:
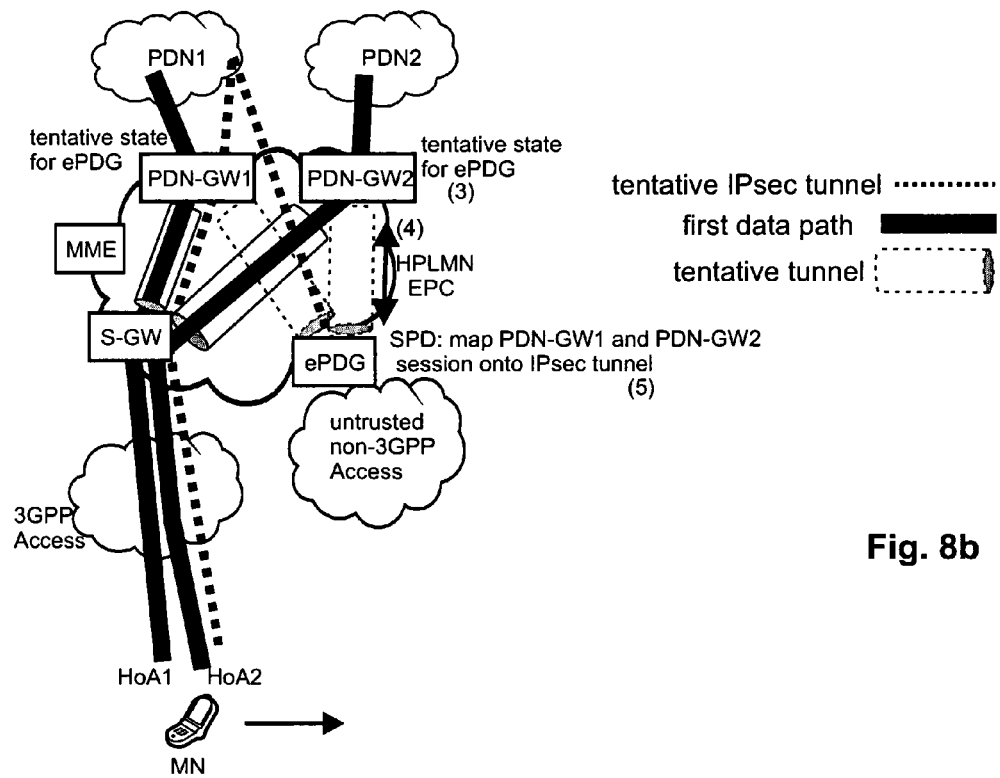

Another more advantageous embodiment of the invention to cope with further IP sessions being established after pre-establishment of tentative tunnels for the previous IP sessions will be discussed in connection with FIGS. 8*a* and 8*b*.

As already discussed in a previous embodiment of the invention, during the pre-establishment of the tentative IKE Security Association between the ePDG and the UE over PDN-GW1, the UE receives an authentication token from the ePDG within or in addition to a common ePDG-ID (1). Then, in case an additional PDN connection is established before performing the handover, the UE includes the authentication token and the ePDG-ID in the PDN connectivity request (2) for establishing said new PDN connection to the PDN-GW2. Based on the ePDG-ID, the PDN-GW2 learns the ePDG the UE has already pre-established the IPsec tunnel to and can therefore create the tentative BCE (3) and the tentative PMIP tunnel to the ePDG (4). With the creation of the PMIP tunnel between PDN-GW2 and ePDG, the authentication token is provided from PDN-GW2 to ePDG in order for the ePDG to identify the UE and to allow modification of the SPD (Security Policy Database), to tunnel packets from the PDN-GW2 also on the tentative IPSec tunnel between UE and ePDG (5) originally established only for the first IP session via PDN-GW1.

An additional advantage of this mechanism is that in case of pre-established tentative IKE/IPSec tunnels with multiple ePDGs, no additional signalling from the UE is needed, since the establishment of the tentative PMIP tunnels is triggered by the establishment of the IP session with the new PDN-GW. Furthermore, the tentative IPsec tunnel established for previous IP session may thus be reused. In contrast thereto, in the alternative solutions before, the UE needs to signal the change to the ePDG, and, in case of several ePDG candidates, to each ePDG.

Furthermore, when PDN-GW1 and PDN-GW2 are co-located, the re-initiation of the IKE/IPSec tunnel establishment described in the second alternative above is still necessary. According to this last solution of FIG. 8, no re-initiation is to be performed at all.

In the previous embodiment an ePDG-ID has been provided to the UE during pre-establishment of the tentative tunnels for the first PDN-GW (1). Then, the ePDG-ID is provided from the UE to the new PDN-GW2 during establishment of the new PDN connection (2), so that the PDN-GW2 learns the ePDG. However, one issue not yet discussed in detail is how the new PDN-GW2 discovers the ePDG based on the ePDG-ID.

In a first alternative the ePDG-ID could be an IP address of the inner ePDG interface. However, a network operator may not want to provide this IP address to the UE. Therefore, the ePDG-ID could be an encrypted ePDG IP address, and the new PDN-GW2 can decrypt the ePDG-ID by either a shared secret between the PDN-GWs, or the new PDN-GW2 asks the AAA server to decrypt the ePDG-ID.

In a second alternative the ePDG-ID could be an FQDN (Fully Qualified Domain Name) of the ePDG, different from the FQDN used by the UE to discover the ePDG.

In a third alternative the ePDG-ID can be assigned by the old PDN-GW1, and the new PDN-GW2 can ask the old PDN-GW about the ePDG IP address corresponding to the ePDG-ID. In said case, the new PDN-GW2 needs to know the old PDN-GW1. One possibility here is, that the UE includes the APN (Access Point Name) used for the old PDN-GW1 in the PDN connectivity request to the new PDN-GW2 when establishing the new IP session. The new PDN-GW2 may thus discover the old PDN-GW1 based on this APN. Or another possibility to enable the PDN-GW2 to learn the old PDN-GW1 is that the MME, that is contacted during session establishment, includes the old PDN-GW1 IP address in the PDN connectivity request transmitted to the PDN-GW2.

In a fourth alternative the ePDG IP address is provided to the PDN-GW2 from the MME in the following way. The MME can be provided with the ePDG information from the AAA/HSS (Home Subscriber Server) when the UE is performing authentication during pre-establishment of the tentative IPsec tunnel for the first IP session. In more detail, the ePDG IP address and ePDG-ID are provided by the ePDG to the AAA/HSS. Because there is a change in the AAA/HSS UE context, the MME is updated with the new context, including the ePDG IP address and ePDG-ID. Accordingly, in the PDN connectivity request for establishing the second IP session via the new PDN-GW2 the MME can then add (or substitute the ePDG ID by) the ePDG IP address received from the AAA/HSS.

Another problem when the ePDG-ID is used for identifying the ePDG is that the ePDG-ID to be used from the new PDN-GW2 could be different from the ePDG-ID used from the old PDN-GW1 (e.g. in case the ePDG-ID relates to an IP address of the ePDG). For example in a roaming scenario the old PDN-GW1 is in a HPLMN (Home Public Land Mobile Network) and the new PDN-GW is in the VPLMN (Visited Public Land Mobile Network). A Visited Public Land Mobile Network is that PLMN on which the mobile subscriber has roamed when leaving its HLPMN. In said cases, an ePDG may be reached via different IP addresses from the differing PLMNs. For example if IPv4 addressing is used within the HPLMN, where also the ePDG is located, the PDN-GW1 may use the local IPv4 address to contact the ePDG and therefore the ePDG-ID is the local IPv4 address. However, from the new PDN-GW in the VPLMN, the local IPv4 address of the ePDG in the HPLMN is not reachable and instead NAT is used. In order to contact the ePDG, the new PDN-GW uses the NAT's IP address and therefore the ePDG-ID is the NAT's IPv4 address.

Figure 9:
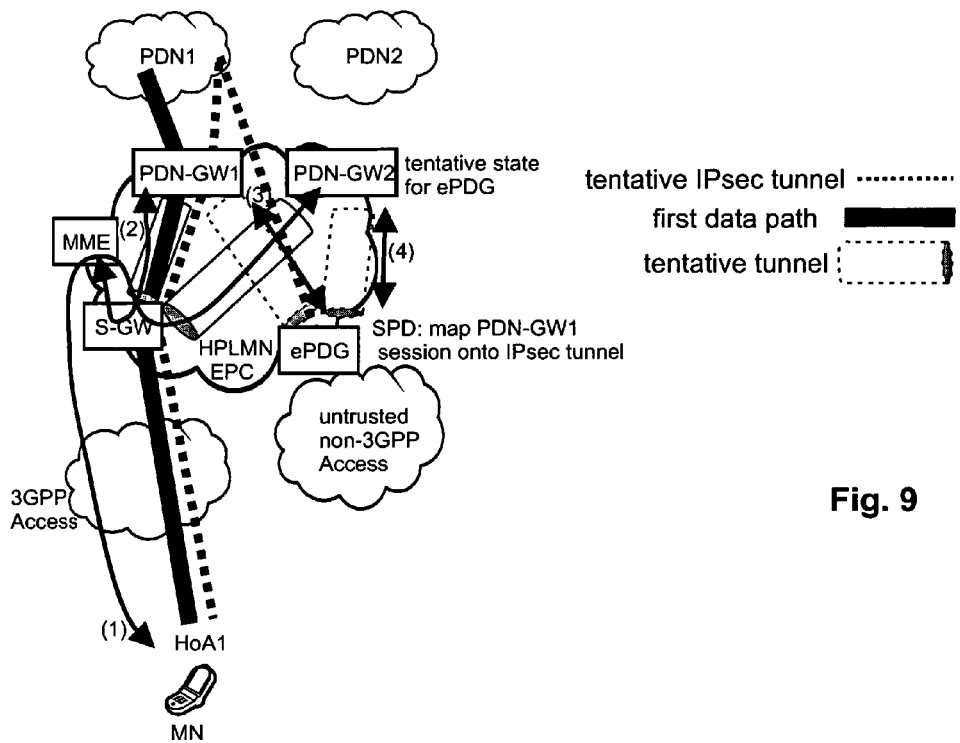
FIG. 9 shows the network deployment and message exchange according to another embodiment of the invention, in which the old PDN-GW1 is used to contact the ePDG for establishing the tentative PMIP tunnel between the new PDN-GW2 and the ePDG, FIG. 10a, b illustrates a network deployment scenario which is problematic since previously established security and PUP tunnels in the source non-3GPP network are lost when handing over to the target non-3GPP network.

One possible way to solve this is shown in FIG. 9. In the PDN connectivity request from the UE to the new PDN-GW2 the APN of the old PDN-GW1 is included (1). The MME determines the old PDN-GW1 based on the APN and provides the new PDN-GW2 IP address and some user specific information (e.g. authentication token or MN-Network Access Identifier) to the old PDN-GW1 (2). Then, the old PDN-GW1 provides the new PDN-GW2 IP address together with the user specific information to the ePDG (3). Based on this trigger, the ePDG will setup the PMIP tunnel and the tentative BCE in the new PDN-GW2 (4). The ePDG-ID assigned by the new PDN-GW2 is provided to the UE during the completion of the UE requested PDN connectivity procedure.

For another embodiment of the invention, it is assumed that the UE is attached to a 3GPP access and at the same time connected to a non-3GPP access. For instance, the UE has a PDN connection established over the 3GPP access and might be actively exchanging user data via the 3GPP network, whereas no user data exchange is performed via the non-3GPP network, In said case, the UE might also perform the pre-establishment of the tentative IKE/IPsec SA with the ePDG, and optionally the tentative PMIP tunnel between ePDG and PDN-GW. In this embodiment however, the UE would establish the IKE/IPsec SA with the ePDG over the non-3GPP access and use its local address in the non-3GPP network instead of the home address of the UE at the PDN-GW. Advantageously, no MOBIKE signalling is necessary to update the tentative IKE/IPsec SA, though MOBIKE might be used to trigger the PDN-GW to perform the path switch.

As mentioned before, there is no need to establish a tentative PMIP tunnel between the ePDG and the PDN-GW already before the handover while establishing the IKE/IPsec tunnel pre-establishment. However, usually the ePDG learns the address of the UE when establishing said PMIP tunnel with the PDN-GW, i.e. the PDN-GW signals the "home" IP address of the mobile node to the ePDG within the PBA, which is transmitted in response to the PBU from the ePDG. Thus, without the signalling for the tentative PMIP tunnel, the ePDG is not aware of the IP address/prefix assigned by the PDN-GW to the UE. Further, the ePDG cannot assign the IP address/prefix to the UE during the pre-establishment of the IPsec tunnel and further, the UE does not know if the expected IP address/prefix is assigned on the IKE/IPsec SA.

One possible solution for this problem is that the IKE/IPsec SA is established without IP address/prefix, and later, during MOBIKE signalling, the PMIP tunnel is established and a (child) SA with the appropriate IP address/prefix is configured. It is advantageous to adapt the IKEv2 protocol in said respect. In more detail, with the current IKEv2 protocol it is not possible to have an IPsec SA without associated IP addresses. Currently, during Child SA establishment, Traffic Selector payloads (TSI and TSr), indicating source and destination addresses/address range of forwarded traffic, are exchanged, and usually they should not be NULL.

Another possibility is that the IKE/IPsec tunnel is established with a different/local IP address/prefix and later, during MOBIKE signalling, the PMIP tunnel is established and a (child) SA with the real IP address/prefix is configured. However, this mechanism would waste IP addresses (that could be a problem e.g. in case of use of IPv4 addresses) and increase complexity on the UE side because of the different IP address/prefix for the same PDN connection.

Another possible way is that the ePDG, in case of pre-establishment, assigns the IP address/prefix corresponding to the source address used by the UE for the IKE signalling, i.e. the ePDG would learn the IP address/prefix to be assigned implicitly. However, this may not work in all cases, because the IP address used for the IKE signalling may be different from the IP address/prefix to be assigned. One example is that the UE is behind a NAT. In this case the source IP address of the UE seen by the ePDG is different from the IP address to be assigned. Another example is described in the following below.

A further problem may arise when the UE has two IP sessions, respectively one via PDN-GW1 and PDN-GW2. It is assumed that the ePDG may only be reached via PDN-GW2, however the UE wants to pre-establish the tentative IP sec tunnel to the ePDG for the IP session going over PDN-GW1. In said case, the ePDG could implicitly accept the source address from which it receives the IKE_SA_nit messages, i.e. the UE's IP address allocated at the PDN-GW2, as the IP address of the UE for which it shall establish the tentative IKE/IPsec SA. However, when performing the IKE_SA_INIT, the ePDG should not use the source address from which the IKE_SA_INIT has been transmitted, because said source address is the IP address of the mobile node allocated at the PDN-GW2, and not the one allocated at the PDN-GW1. Instead, the UE's IP address allocated at the PDN-GW1 has to be explicitly signaled to the ePDG, in order for the ePDG to establish the tentative IKE/IPsec SA with the appropriate IP address. As said already, usually the ePDG would learn the correct IP address explicitly from the PDN-GW during the PBU/PBA exchange. According to an embodiment of the invention, the UE indicates during the IKE/IPsec SA pre-establishment the previously allocated IP address/prefix for the PDN-GW1 connection to the ePDG, e.g. in the INTERNAL_IP4_ADDRESS or the INTERNAL_IP6_ADDRESS attribute in the CFG_REQUEST Configuration Payload within the IKE_AUTH request message.

Therefore, the ePDG does not exchange PBU/PBA with the PDN-GW and just assigns the indicated IP address/prefix to the UE during the IKE/IPsec SA establishment without verifying the IP address/prefix. Furthermore, the ePDG stores the IP address/prefix in a separate database entry, independent from any routing table or IKE/IPsec security policy database. As long as the IKE/IPsec tunnel is only pre-established, the ePDG shall not forward any downlink packets over the IPsec tunnel to the UE (Basically there should be not downlink packets arriving at the ePDG), and the ePDG does not forward any uplink packets received over the tentative IPsec tunnel. Then, when the UE updates the IKE(IPsec tunnel with MOBIKE (to activate the tentative IKE/IPsec tunnel, the ePDG exchanges PBU/PBA (including the indicated IP address/prefix with the PDN-GW. When the indicated IP address/prefix is verified by the PBA, the ePDG forwards packets in uplink and downlink (and updates the database entries).

Similarly, an explicit signaling of the UE's IP address is needed in case the PDN-GW or another node in the PDN implements NAT (Network Address Translation) for the UE. In said case, when the UE communicates with an external network such as the Internet, the IP address of the UE is translated in the PDN-GW or in the other node into the address of the private network. However, for the ePDG to establish the tentative IKE/IPsec SA it is advantageous to use the IP address of the UE within the private network. Therefore, the UE should also explicitly inform the ePDG about the IP address which is to be use for establishing the tentative IKE/IPsec SA. This may be also done in the INTERNAL_IP4_ADDRESS or the INTERNAL_IP6_ADDRESS attribute in the CFG_REQUEST Configuration Payload within the IKE_AUTH request message.

Figure 10A:
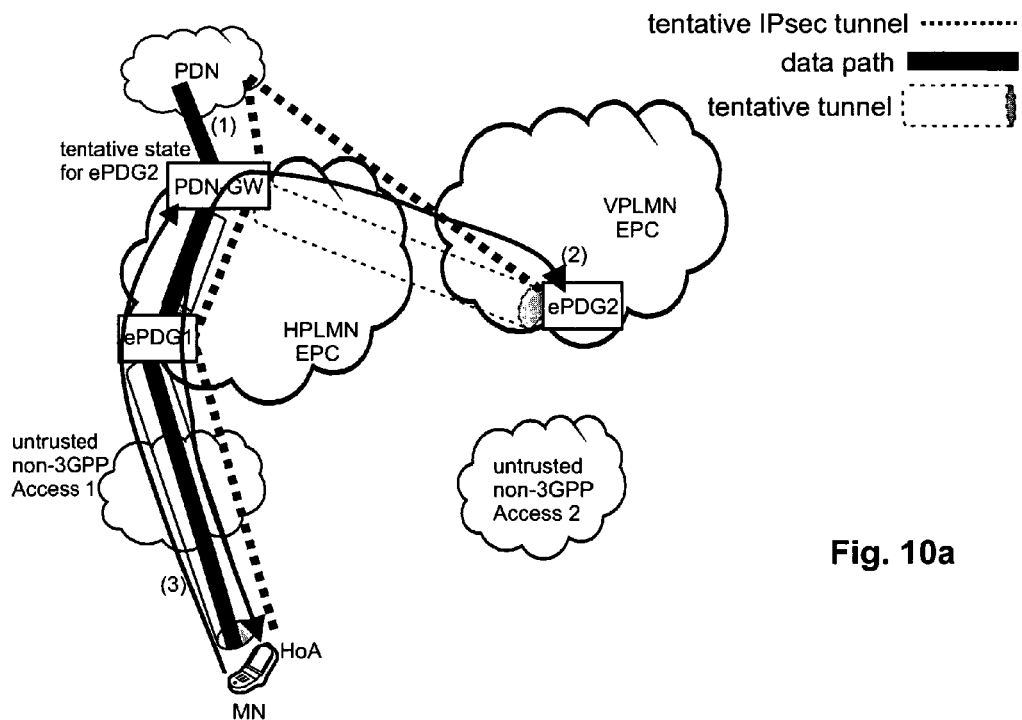
Figure 10B:
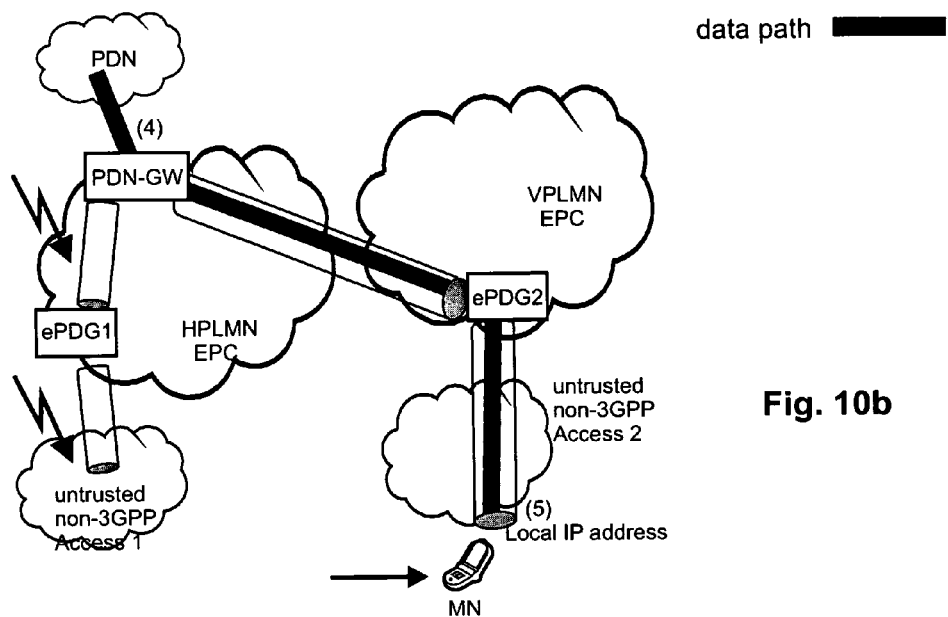

According to another embodiment of the invention, the following scenario according to FIG. 10a and b is assumed, where the old ePDG is not reachable from the new access, however the previous IPsec and PMIP tunnels shall be maintained in a tentative state for future use. In particular, the UE is actively connected over an untrusted non-3GPP access 1 to ePDG1 and is using HoA for one IP session (1) via the PDN-GW. From a neighbouring untrusted non-3GPP access 2 the UE cannot use ePDG1, i.e. it needs to use ePDG2. According to the various embodiments of the invention, the UE pre-establishes a tentative IKE/IPSec tunnel with the ePDG2 using HoA and the tentative PMIP tunnel between the PDN-GW and ePDG2 (2). During the pre-establishment of the tentative IPsec tunnel the UE receives the ePDG2-ID. Correspondingly, two tentative tunnels are pre-established for using same when in untrusted non-3GPP network 2 by only activating the tunnels, while still attached to untrusted non-3GPP network 1.

Immediately before the handover to untrusted non-3GPP access 2, the UE indicates the ePDG2-ID to the PDN-GW to activate the tentative state of the PMIP tunnel to ePDG2 (3). In response, the PDN-GW switches the PMIP tunnel to ePDG2 (4), and furthermore the UE activates the tentative IPsec tunnel and uses MOBIKE to update the IPsec tunnel to the ePDG2 (5) using the UE's local IP address at the untrusted non-3GPP access 2. However, from the untrusted non-3GPP access 2 the ePDG1 is not reachable, thus the IPsec tunnel as well as the PMIP tunnel provided for the data path to the non-3GPP network 1 will be broken down. In more detail, the IKE security association has a lifetime which expires in case the connection between the IKE-SA endpoints is interrupted for a predetermined time. Correspondingly, the PMIP tunnel is also bound to an active connection; in case the PMIP tunnel is not needed for a predetermined time, same is torn down.

However, in case the UE would move back towards the non-3GPP network 1, the IPsec and PMIP tunnels would have to be established from scratch. It would be advantageous to maintain already established tunnels (IPsec and PMIP) used in a source network in a tentative state, while the UE is attached to another access network, be it a non-3GPP or 3GPP or trusted/untrusted network.

Figure 11:
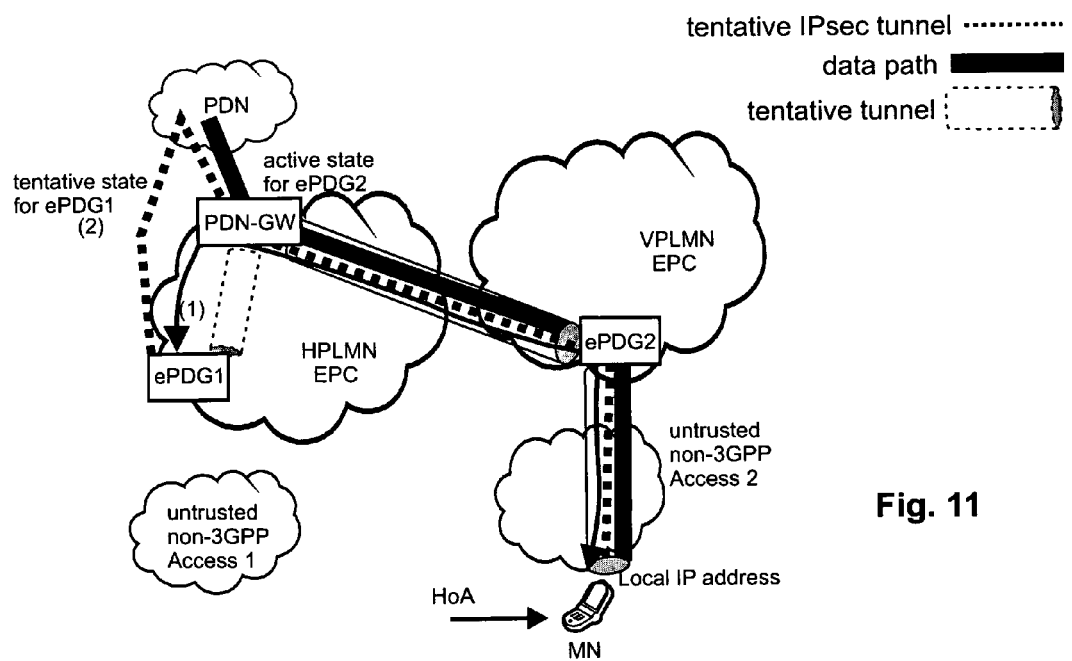
FIG. 11 shows a network deployment and message exchange according to another embodiment of the invention for solving the problem illustrated in connection with FIG. 10a, b, FIG. 12a, b shows a network deployment and message exchange according to still another embodiment of the invention for solving the problem illustrated in connection with FIG. 10a, b.

One way to overcome this problem is depicted in FIG. 11, according to same the UE after handover to ePDG2 uses MOBIKE with its own HoA to keep the IPsec tunnel to ePDG1 alive (1) by maintaining connectivity between ePDG1 and the UE. In addition, the UE signals to the ePDG1 that the IPsec tunnel between ePDG1 and PDN-GW shall be maintained in a tentative state. In response thereto, the ePDG1 instructs the PDN-GW to not trigger the path switch; thereby the PMIP tunnel between the ePDG and the PDN-GW is kept and a tentative state of the PMIP tunnel for ePDG1 is established in the PDN-GW (2).

However, this requires additional signalling over the air due to the MOBIKE signalling to ePDG1 to keep the IPsec tunnel for the non-3GPP network 1 alive. Furthermore, packets might get lost if they have been sent from the PDN-GW to the UE before the path switch trigger to the ePDG2 was received and if the UE disconnects from the untrusted non-3GPP access 1 link before the delivery.

Figure 12A:
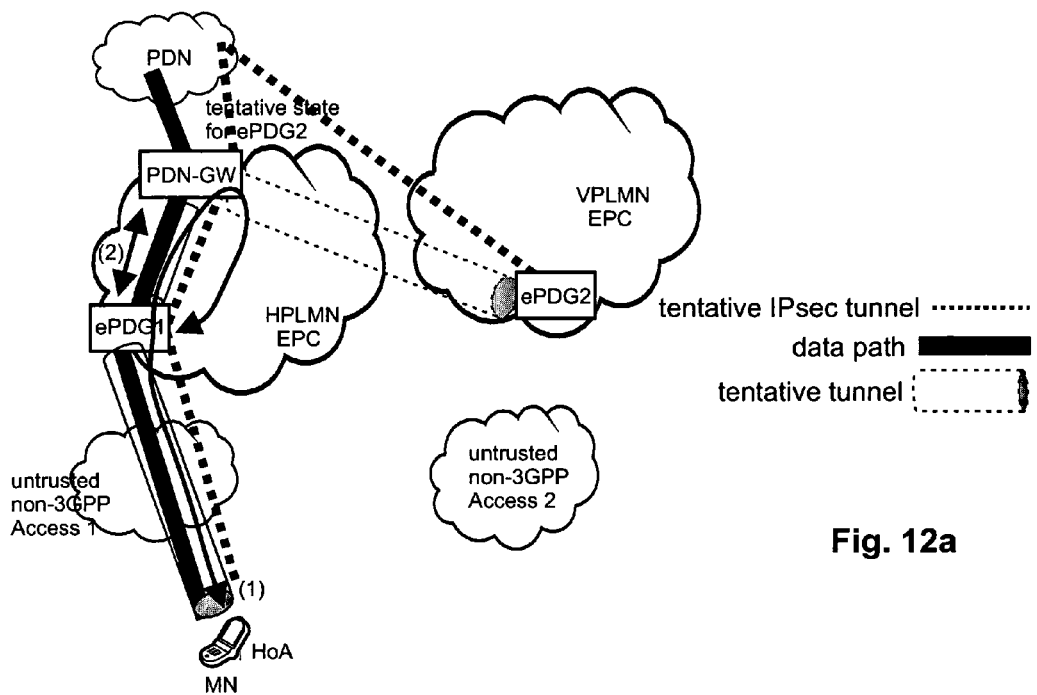
Figure 12B:
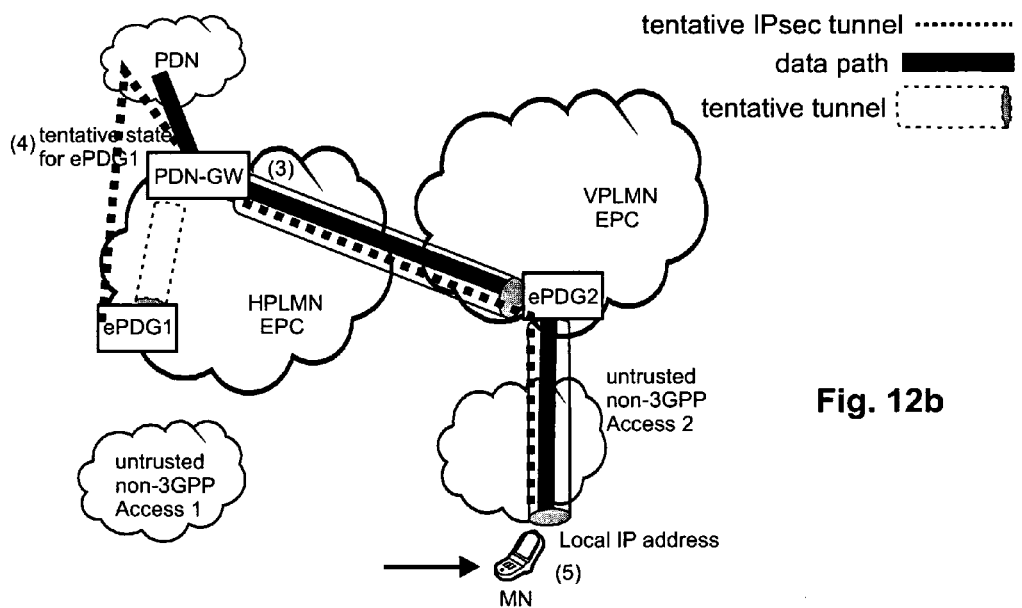

Another possibility without the drawbacks described above is shown in FIG. 12a and b. The main difference to the previous embodiment of the invention of FIG. 11 is that the relevant steps are already performed while the UE is still attached to non-3GPP network 1 and not after the handover to non-3GPP network 2, According to said alternative embodiment of the invention, immediately before the handover of the UE to non-3GPP network 2, the UE uses the MOBIKE protocol with ePDG1 using its HoA so as to ensure connectivity of the IPsec tunnel also after the handover, since the IKE SA between ePDG1 and UE is updated using the UE's HoA. Correspondingly, the IPsec tunnel between the PDN-GW and ePDG1 is put into a tentative state. The MOBIKE signaling of the UE with ePDG1 also includes the identification of ePDG2 (1) which will be used after the handover for connecting the UE to the core network.

In response thereto, the ePDG1 transmits a message including the ePDG2-ID to the PDN-GW (2) and thus triggers in the PDN-GW to activate the tentative state of the pre-established PMIP tunnel to the ePDG2 and to switch to said activated PMIP tunnel to ePDG2 (3). With the trigger to activate the tentative state or in a separate message, the ePDG1 triggers to change the state of the PMIP tunnel between the PDN-GW and ePDG1 into tentative (4). The UE further uses MOBIKE to update the IKE/IPSec tunnel to the ePDG2 after the handover to non-3GPP network 2 is complete.

In the above scenarios it has been assumed that the UE hands over from one ePDG to another. Now in case the UE repeatedly moves between ePDG1 and ePDG2, a ping-pong effect may occur with increased processing in the PDN-GW, ePDG and UE, and increased signalling (and also possible packet loss). In more detail, when changing the ePDGs, the tentative PMIP/IPsec tunnels of the target network would have to be activated, and the PMIP/IPsec tunnels of the source network would have to be deactivated, i.e. put into a tentative state.

However, in case of the above-described ping-pong scenario, switching the states of the tunnels between active and tentative is problematic since a lot of packets might get lost or cannot be delivered to the UE. For example, assuming the UE is in non-3GPP network 2, and correspondingly, the PMIP tunnel and IPsec tunnel for ePDG2 are active, and the ones for ePDG1 are tentative. When handing over to non-3GPP network 1, the PMIP/IPsec tunnels for ePDG1 are activated, and correspondingly, the UE is no longer reachable from ePDG2. However, data packets might have been transmitted from the PDN-GW to the ePDG2, shortly before the PMIP tunnel is switched from ePDG2 to ePDG1 and the mobile node hands off to non-3GPP network 1. In said case, those data packets that are on the way to ePDG2 cannot reach the UE anymore since no connection to the UE is available from ePDG2. Thus, ePDG2 would drop said data packets after a time.

Figure 13:
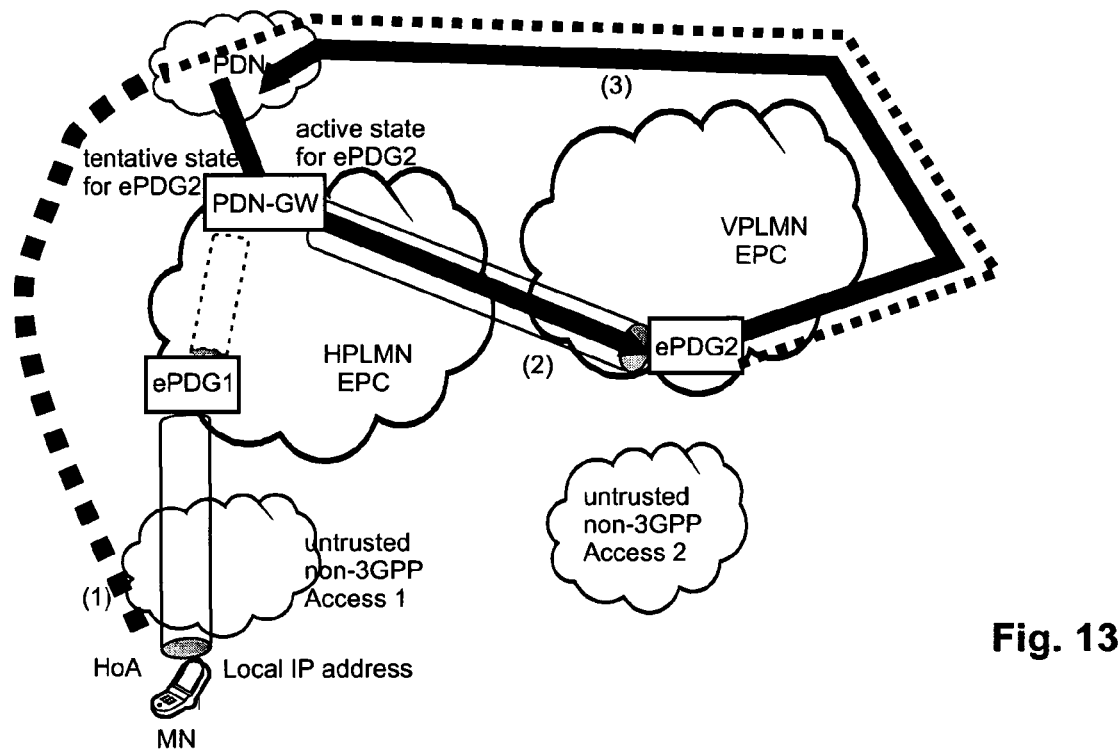
FIGS. 13, 14 show a network deployment and message exchange for a solution to a ping-pong scenario of the UE, which entail problems rendering them unusuable, FIG. 15a, b show a network deployment and message exchange according to another embodiment of the invention for managing a ping-pong scenario of the UE, FIG. 16a, b show a different network deployment and message exchange according to still another embodiment of the invention for managing another ping-pong scenario of the UE.
Figure 14:
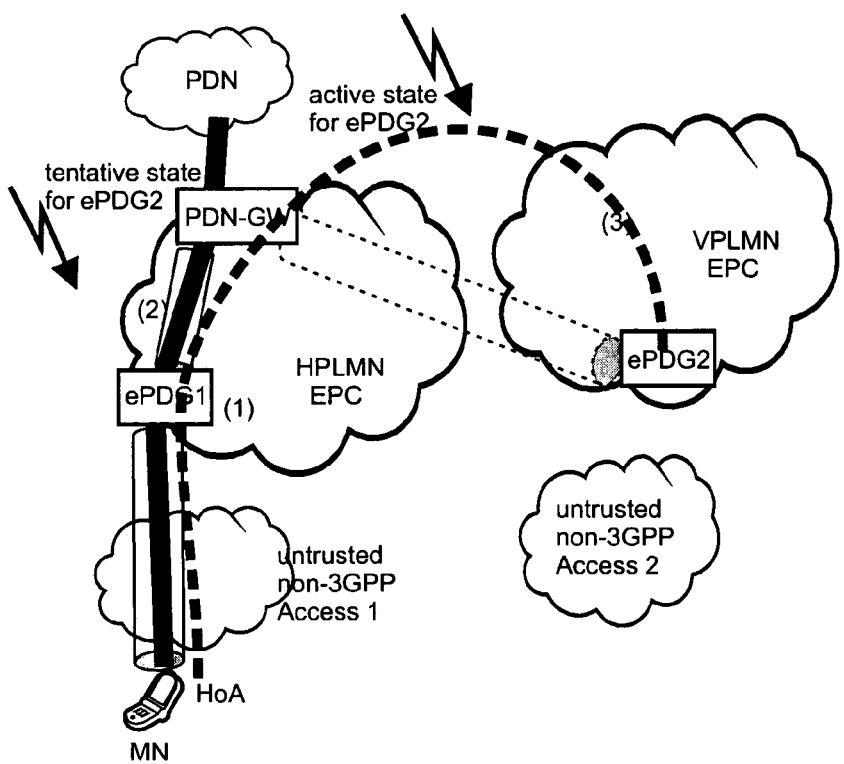

Two possibilities for coping with said scenario will be presented in connection with FIGS. 13 and 14, though said possibilities entail other problems which render them non-functional. In the scenarios of FIGS. 13 and 14, the IPsec tunnel between UE and ePDG2 is not deactivated when handing over from non-3GPP network 2 to non-3GPP network 1 but updated with the Home Address of the UE (1), which was assigned by the PDN-GW. Further, the scenarios of FIGS. 13 and 14 differ from one another in that the IPsec tunnel between UE and ePDG is updated before the handover to non-3GPP access 1 on the one hand (FIG. 13), and conversely updated after the handover to non-3GPP access 1 (FIG. 14).

In particular, with reference to FIG. 13, before the UE leaves the untrusted non-3GPP network 2, the UE updates the active IPsec tunnel for ePDG2 instead of deactivating it. More specifically, the UE might change the IPsec tunnel from "local IP address—ePDG2" to "HoA—ePDG2" (1) by using its Home Address with MOBIKE, and the PMIP tunnel between the PDN-GW and ePDG2 needs to be maintained active as well. Conversely, since the PMIP tunnel to ePDG2 is active, the PMIP tunnel between the PDN-GW and ePDG1 is maintained in a tentative state. In said case, the PDN-GW would tunnel packets destined to HoA to ePDG2 (2) and ePDG2 would tunnel packets destined to HoA to HoA, i.e. they would be received at the PDN-GW (3). As apparent, this would cause a loop and the data packets would not be delivered to the UE.

With regard to FIG. 14, the UE is again initially located in non-3GPP network 2 and performs a handover to non-3GPP network 1, i.e. activates the tentative PMIP/IPsec tunnels for ePDG1. As done in the scenario of FIG. 13, the IPsec tunnel between UE and ePDG2 is not deactivated but updated via MOBIKE using the UE's HoA, assigned by the PDN-GW. In contrast to the scenario of FIG. 13, the PMIP tunnel to ePDG2 is deactivated and instead the tentative PMIP tunnel to ePDG1 is activated for use by the UE after the handover. However, in order to reduce the signalling load in the network and to use the updated IPsec tunnel between ePDG2 and UE, the PMIP tunnel between the PDN-GW and ePDG2 would need to remain active and conversely the PMIP tunnel to ePDG1 tentative. However, the PMIP tunnel to ePDG1 shall remain active in order to correctly receive the data when in the new non-3GPP network area. Therefore, this approach is not feasible.

Figure 15A:
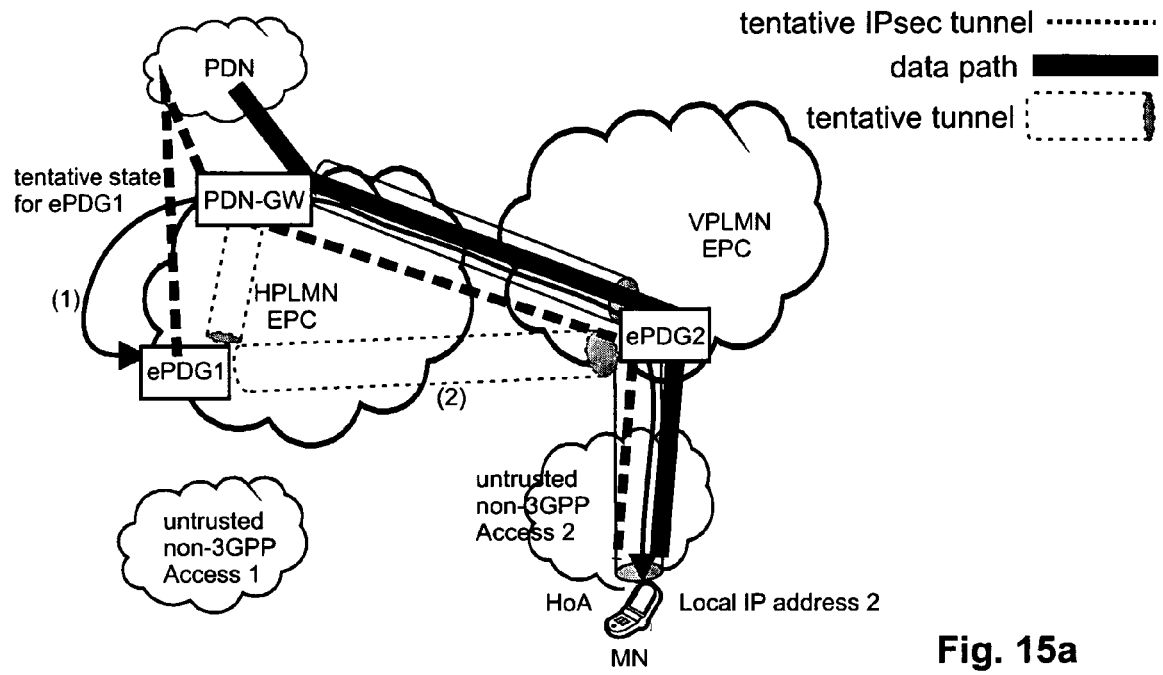
Figure 15B:
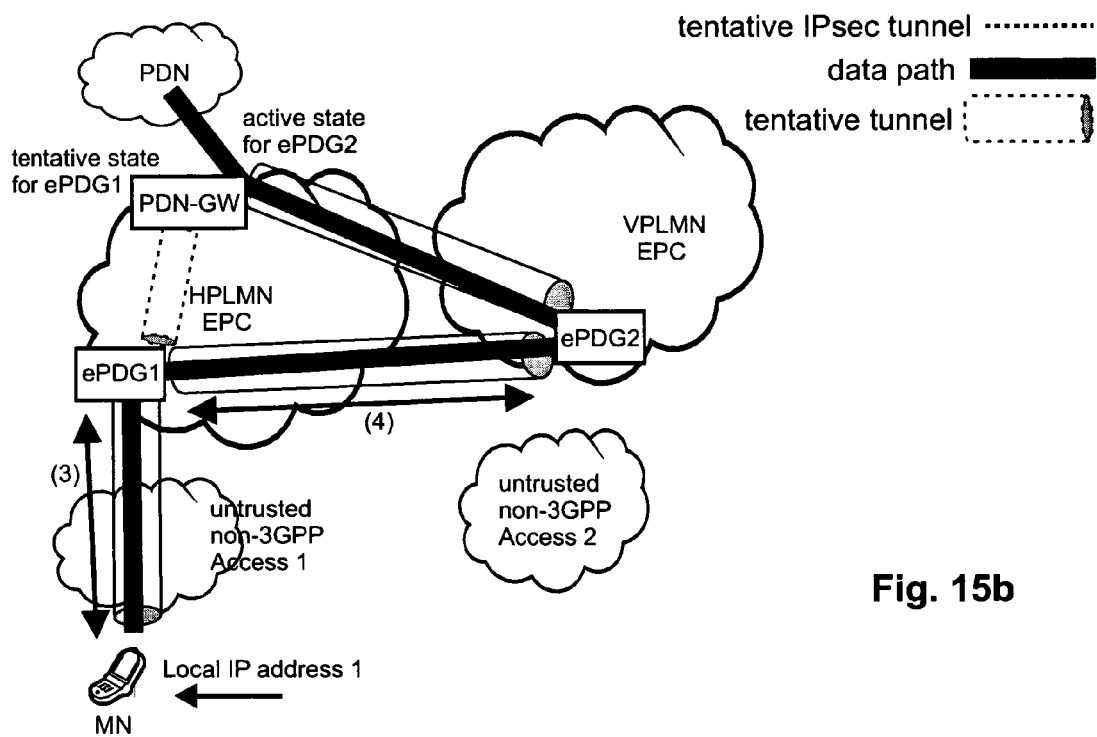
Figure 16A:
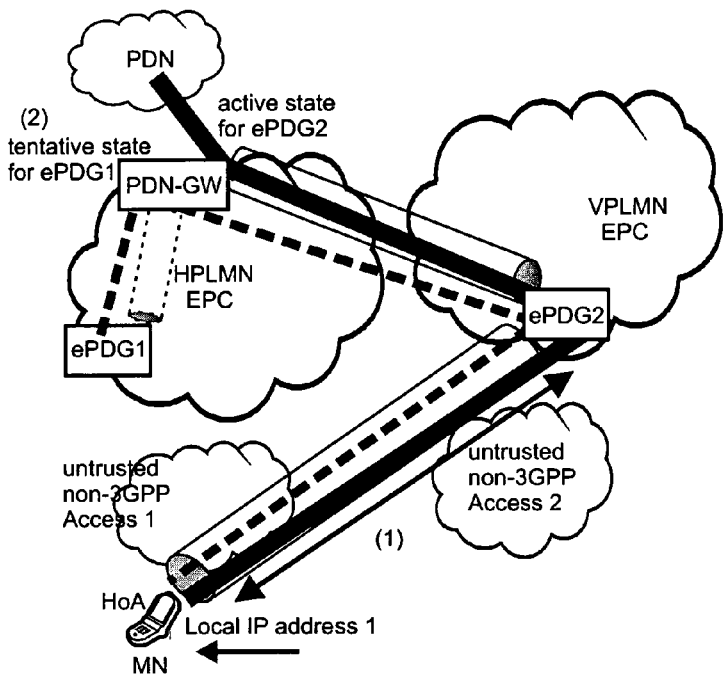
Figure 16B:
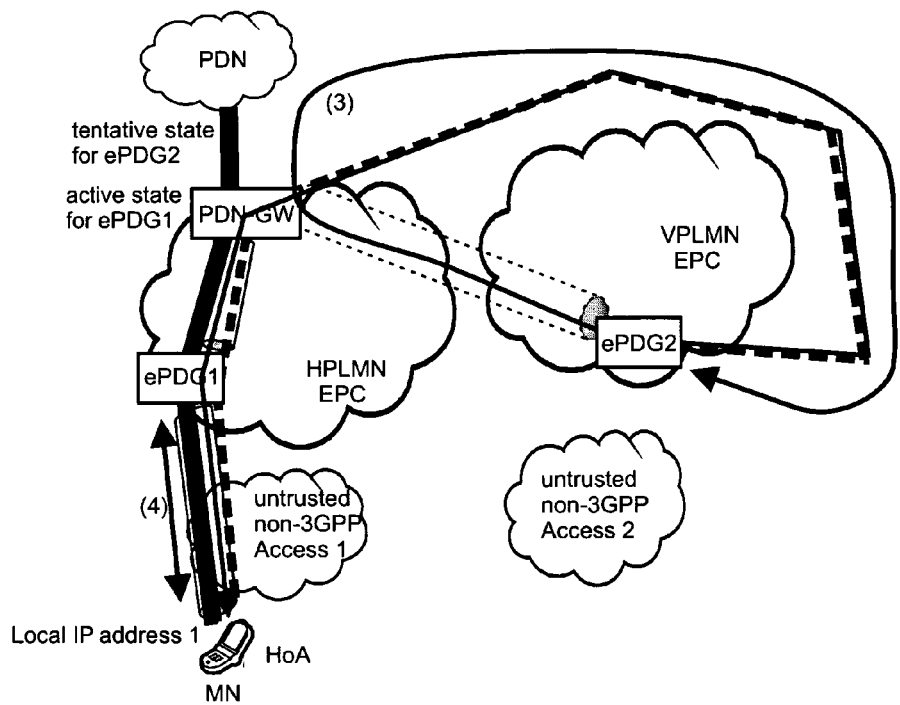

One working solution will be presented in FIGS. 15a and 15b, according to a further embodiment of the invention. In said embodiment, tunnelling between the ePDGs is used. In more detail, the UE is located in non-3GPP network 2, expects a handover and thus pre-establishes tentative PMIP/IPsec tunnels in non-3GPP network 1 (1). Furthermore, in case the UE suspects to get into a ping-pong scenario, while performing the UE-ePDG1 IKE/IPsec tunnel pre-establishment, the UE triggers the ePDG1 to setup a tentative forwarding (PMIP) tunnel between ePDG1 and ePDG2 (2). In case of handover, the UE updates the IPsec tunnel to the ePDG1 using MOBIKE (3) and triggers ePDG2 to forward packets to ePDG1. The PMIP tunnel from PDN-GW to ePDG1 is not activated but maintained in a tentative state. Also the IPsec tunnel to the ePDG2 can be updated via MOBIKE using the UE's HoA. Then, in case ping-pong occurs, it suffices to update the IPsec tunnel between the UE and respectively ePDG1 and ePDG2. Thus, the path switch is closer to the UE, i.e. signalling load is reduced and the PDN-GW is not affected.

According to another different ping-pong scenario, similar problems may arise as before. For instance, the UE is actively connected over an untrusted non-3GPP access 1 to ePDG1 and is using HoA for the IP session. From a neighbouring untrusted non-3GPP access 2 the UE can use ePDG1, but ePDG2 is preferable. The UE pre-establishes the IKE/IPSec tunnel with the ePDG2 using the HoA over the existing PDN-GW connection and receives the ePDG2-ID. Immediately before the handover the UE uses MOBIKE to the ePDG1 with the HoA and includes in addition the ePDG2-ID. This signalling triggers the change of the state in the PDN-GW and at the same time updates the IKE/IPSec SA with the ePDG1. The ePDG1 updates the PMIP tunnel to the PDN-GW and includes the ePDG2-ID. The PDN-GW activates the tentative state, switches the tunnel to the ePDG2 and makes the tunnel to the ePDG1 tentative. The UE uses MOBIKE to update the IKE/IPSec tunnel to the ePDG2.

In this scenario, if the UE moves between ePDG1 and ePDG2, a ping-pang effect may occur with increased processing in PGW, ePDG and UE, and increased signalling.

To avoid this effect, the UE, when suspecting to get into a ping-pang scenario, uses MOBIKE with only the active IPsec tunnel to ePDG2 (1) and keeps the other IPsec tunnel to ePDG1 in a tentative state (2). Therefore, data is received via ePDG2 and the IPsec tunnel between UE and ePDG2, while the IPsec tunnel to ePDG1 is in a tentative state, though the UE is in non-3GPP network 1. When the UE assumes that ping-pong will not happen anymore, it updates the tunnel to the not preferred ePDG using the HoA (3) (if not used already) and updates the tunnel to the preferred ePDG using the local address (4).

In the above embodiments it has been described that the UE uses the IP address assigned by the PDN-GW to establish the tentative IKE/IPsec tunnel to the ePDG. However, in order for the UE to be able to exchange IKE messages with the ePDG it is required that the ePDG is reachable from the appropriate PDN. However, this requirement might not be true always. Instead, one problem is that the ePDG may not be reachable from this used PDN. For instance, the UE could be a single PDN UE, i.e. only one PDN connection is possible per time (for example because the UE implementation is simpler/easier/cheaper and does not support connectivity with multiple PDNs, or the UE is subscribed to use only a single PDN at a time) or from UE and network perspective it is preferable to have only a single PDN connection (because multiple PDNs increase signalling load, states and resources in the UE and the network). Thus, if the UE is a single PDN UE or a single PDN connection is preferred and the current PDN connection is for example a private or corporate network, the ePDG may not be reachable from this used PDN, because all traffic from/to external networks is blocked by a firewall.

Figure 17:
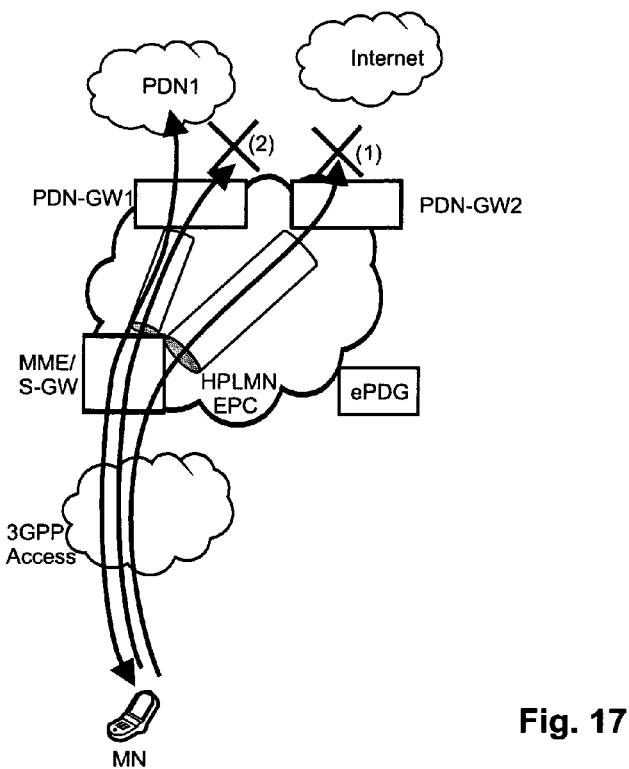
FIG. 17 illustrates a network scenario in which the ePDG is not reachable by the UE via the PDN-GW1 and PDN-GW2, FIG. 18a, b illustrates a network scenario and signaling exchange for an embodiment of the invention, where the tentative IKE/IPsec SA/tunnel is pre-established.

In FIG. 17 the unreachability of the ePDG is illustrated for a particular exemplary scenario, in which the UE tries to establish a connection to the Internet to thus reach the ePDG to pre-establish the tentative IKE/IPsec SA. As already said before, it is not allowed for the UE to have further PDN connections apart from the PDN-GW1 connection to the Private/Corporate PDN (1). Correspondingly, the UE may not reach the Internet via PDN-GW2. Furthermore, the PDN-GW1 only allows traffic with the Private/Corporate. Therefore, PDN-GW1 blocks traffic going to the Internet.

In such a scenario, the object is how to pre-establish the IKE/IPsec SA with the ePDG when the UE is connected to a PDN from which the ePDG is not reachable.

One possible first solution to said problem is that the UE disconnects from the first PDN connection and switches to a different, a second PDN connection when no data is sent or received and pre-establishes the IKE/IPsec tunnel with the ePDG and switches back to the previous, the first PDN, afterwards. However, in this case IP address preservation for the first PDN connection cannot be ensured, because when the UE disconnects from the first PDN-GW1 and reconnects later, the PDN-GW1 may have assigned the previously allocated IP prefix meanwhile to a different UE. Furthermore, this procedure requires that there is a time period without uplink/downlink data, which in praxis may not be available, and even less at the required moment when wanting to perform the pre-establishment of the tentative IKE/IPsec SA.

One variation of said first solution is that the UE sends a trigger to either the PDN-GW1 or the S-GW to buffer downlink packets and preserve the IP address for a later re-attach. Then, the UE may disconnect from the PDN-GW1 connection and switch to the second PDN-GW2 to pre-establish the tentative IKE/IPsec SA with the ePDG. After the IKE/IPsec tunnel with the ePDG is successfully pre-established and put in a tentative state, the UE switches back to the first PDN. In more detail, the UE may send a special PDN disconnection message with an IP address preservation indication to the MME. When receiving this special PDN disconnection, the MME keeps the UE context and the S5 bearer between the PDN-GW and the S-GW/MME. In addition, the MME may send a trigger to the S-GW to buffer downlink packets, or the S-GW may alternatively forward the trigger to the PDN-GW1 so that the PDN-GW1 performs the downlink buffering instead of the S-GW. Also, the UE keeps its IP address and buffers uplink packets coming from the applications at the UE.

One problem when the UE uses a second PDN connection to establish the tentative IKE/IPsec tunnel with the ePDG and switches afterwards back to the first PDN connection is that the dead peer detection (DPD), that is usually performed periodically for an IKE SA, detects that the UE is not reachable any more and thus the tentative IKE SA is eventually deleted. In order to solve said problem, the DPD mechanism may be deactivated, e.g. triggered by the UE. Alternatively, the UE has to keep the IKE SA alive by synchronizing the keep alive timer interval between the UE and the ePDG such that the UE can switch to the second PDN connection to keep the IKE SA alive before the corresponding timer in the ePDG expires.

A further alternative to said first solution when the ePDG is not reachable for the UE via the current PDN, is that when the UE powers up, the UE connects to a second PDN connection first, instead of connecting to the intended first PDN. Then, the UE may establish the IKE/IPsec tunnel with the ePDG, and signals the APN of the desired (first) PDN in the IKE signalling to the ePDG. Subsequently, the ePDG establishes the PDN connection with the PDN-GW1. Afterwards, the UE disconnects from the PDN-GW2 and signals handover PDN connection establishment to the MME for PDN-GW1, and in response thereto, the MME triggers the S-GW to initiate the switch of the PMIP tunnel from the ePDG to the 3GPP Access for the connection to PDN-GW1. This solution is illustrated in FIG. 18.

Figure 18A:
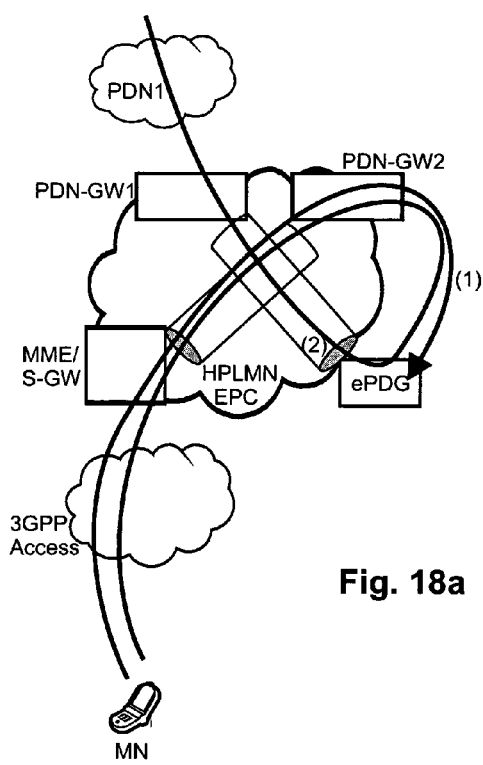
Figure 18B:
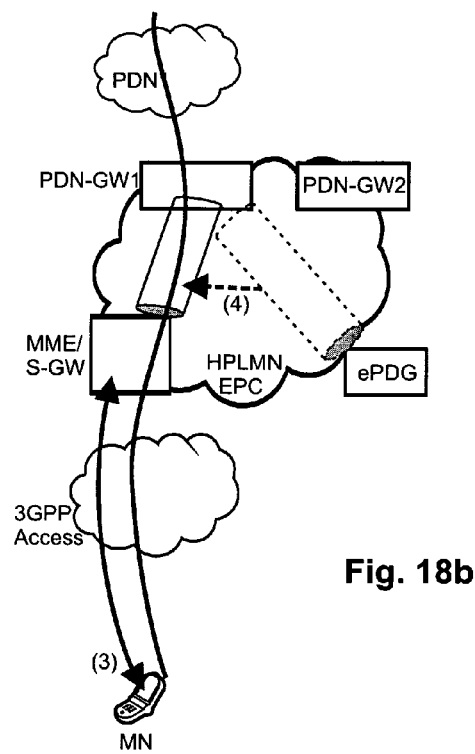

One additional advantage of the solution according to the embodiment depicted in FIG. 18 is that the UE can create the pre-established tentative IKE/IPsec tunnel for the PDN connection with the ePDG even for a legacy ePDG. However, some changes to existing 3GPP Release-8 procedures would be advantageous. In 3GPP Release-8, the PDN-GW initiated Resource Allocation Deactivation is performed in case of handover to the 3GPP access and thus would delete the IKE SA state in the ePDG. To avoid same, the UE may indicate in the handover PDN connection establishment to the MME (step 3) that the resources in the source access should not be deactivated. This can be informed to the S-GW and included in the PBU from the S-GW to the PDN-GW. Thus, the IKE SA between the UE and the ePDG is still active, even if the UE is in the 3GPP access.

Furthermore, an additional change would be advantageous, because after handover from 3GPP to untrusted non-3GPP access, the BCE (Binding Cache Entry) in the PDN-GW must be updated in order to switch the path and enable transfer of data packets to the ePDG, but MOBIKE does not trigger the ePDG to send the PBU. Therefore, before moving to the untrusted non-3GPP access, the UE may signal to the MME to trigger the S5 deactivation and S2*b* activation. Thus, the BCE in the PDN-GW can be updated.

Figure 19:
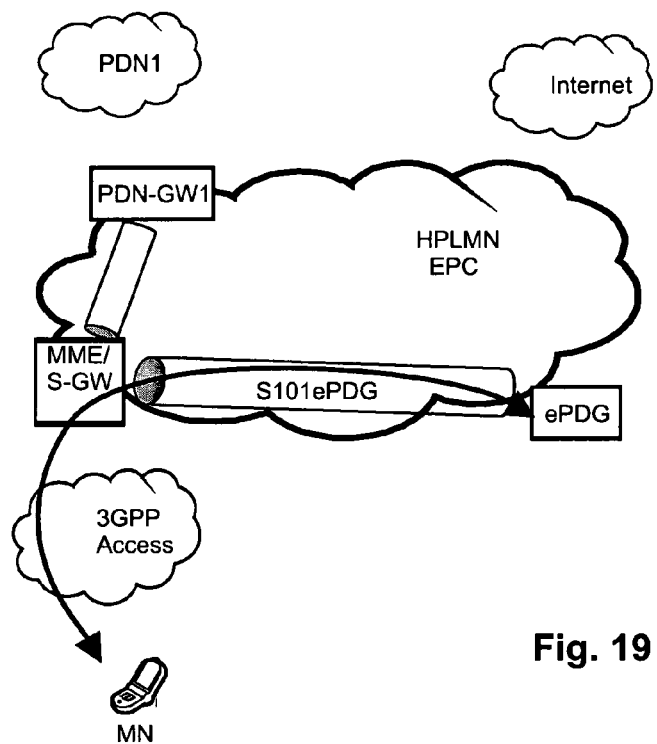
FIG. 19 illustrates a network scenario, and in particular a new S101ePDG interface between the MME and ePDG according to a further embodiment of the invention.

A second more advantageous solution for those cases in which the ePDG is not reachable from the PDN, is that the ePDG is enhanced to support a direct interface with other network entities, such as the MME for example. The interface may also connect the ePDG with another entity from the core network such as the S-GW or the PDN-GW. In the following it is assumed that the direct interface is configured between the ePDG and the MME. In said case, though the ePDG is not reachable from the PDN, the UE is able to pre-establish the tentative IKE/IPsec SA with the ePDG via the MME, e.g. using NAS (Non-Access Stratum) signaling. This is depicted in FIG. 19.

The new interface between the MME and the ePDG may be similar to the S10 interface between an MME and HRPD networks, which has been standardized for supporting HRPD (High Rate Packet Data) pre-registration during an optimized HRPD handover. Thus, the new interface may be termed S101ePDG, and enables interactions between the ePDG with MMEs. The S101ePDG interface is configured to be used for the pre-establishment of the tentative IKE/IPsec SA between the UE and the ePDG. Similar to the S101 interface, the S101ePDG interface may be based on the GTP-C protocol. Thus, the protocol stack, UDP and IP headers used for the S101ePDG interface may be based on the GTP-C protocol. Furthermore, the ePDG and the MME must be implemented in the same security environment, i.e. both entities must know each other and should be able to authenticate each other. Direct Transfer Request and Direct Transfer Response messages may be used to transport data between the MME and the ePDG, for instance within a transparent container.

Figure 20:
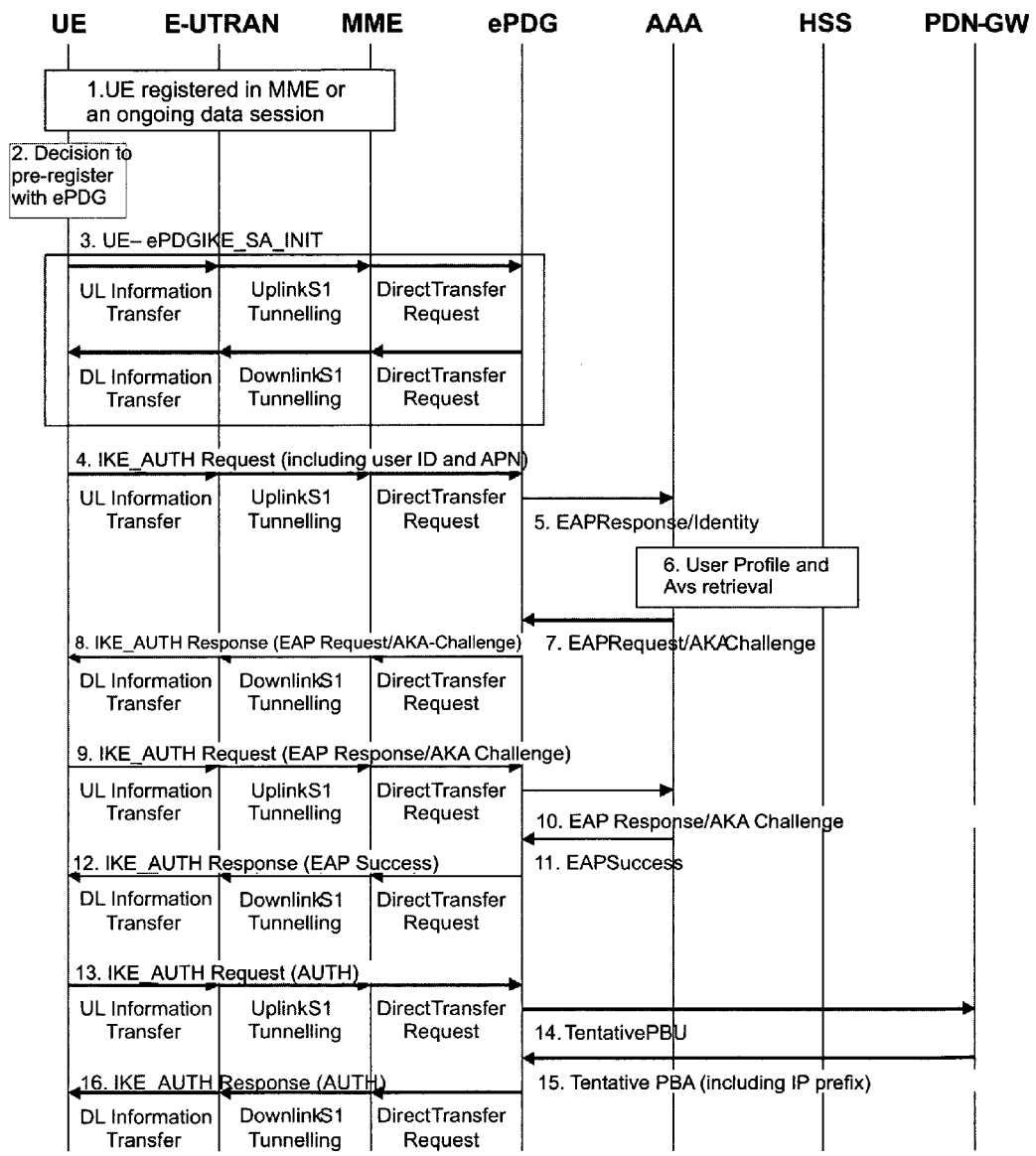
FIG. 20 shows a signaling exchange for the embodiment of the invention using the S101ePDG interface for exchanging messages to pre-establish a tentative IKE/IPsec SA/tunnel between the ePDG and the UE.

FIG. 20 is a signalling diagram illustrating the signal exchange between the UE and the ePDG via the direct interface S101ePDG between ePDG and UE for pre-establishing an IKE/IPsec SA.

1. The UE is registered with E-UTRAN/MME. It may have an ongoing data session established over the EPS/E-UTRAN access.
2. The UE decides to initiate a pre-registration procedure with the ePDG, i.e. to pre-establish the IKE/IPsec SA with the ePDG.
3. The UE starts with the IKE_SA_NIT exchange. The IKE messages are tunnelled transparently over the E-UTRAN and EPC. The UE generates an UL Information Transfer message (UL IKE message). The UL IKE message is transferred from the UE to the eNB as a parameter in the UL Information Transfer message. The eNB sends Uplink S1 Tunnelling message (including the UL IKE message) to the MME. The MME selects an ePDG. In order to be able to distinguish S101ePDG signalling transactions belonging to different UEs, an S101ePDG Session ID may be used to identify signalling related to that UE on S101ePDG (similar to the Session ID for the S101 interface in the optimized HRPD handover). The MME sends a Direct Transfer Request message (S101ePDG Session ID, UL. IKE message) to the ePDG. The ePDG sends signalling in the DL direction to the MME using Direct Transfer Request message (S101ePDG Session ID, DL IKE message). The S101ePDG Session ID is used to associate the signalling to a particular UE. The MME sends the information to the eNB using the Downlink S1 Tunnelling message (DL IKE message). The eNB uses the DL information transfer message (DL IKE message) to transport the signalling to the UE.
4. The UE, ePDG and 3GPP AAA server exchange EAP AKA signalling in IKE transparently over E-UTRAN and EPC to authenticate the UE on the ePDG. The UE sends the user identity and APN information.
5. The ePDG sends the Authentication and Authorization Request message to the 3GPP AAA Server, containing the user identity and APN.

6. The 3GPP AAA Server fetches the user profile and authentication vectors from HSS (if these parameters are not available in the 3GPP AAA Server).
7. The 3GPP AAA Server initiates the authentication challenge.
8. The ePDG responds with its identity, a certificate, and sends the AUTH parameter to protect the previous message it sent to the UE (in the IKE_SA_INIT exchange). It completes the negotiation of the child security associations as well (The SA for the IPsec tunnel may be called child SA). The EAP message received from the 3GPP AAA Server (EAP-Request/AKA-Challenge) is included in order to start the EAP procedure over IKE.
9. The UE checks the authentication parameters and responds to the authentication challenge.
10. The ePDG forwards the EAP-Response/AKA-Challenge message to the 3GPP AAA Server and the AAA checks, if the authentication response is correct.
11. When all checks are successful, the 3GPP AAA Server sends the final Authentication and Authorization Answer (with a result code indicating success) including the relevant service authorization information, an EAP success and the key material to the ePDG.
12. The EAP Success message is forwarded to the UE over IKE.
13. The UE generates the AUTH parameter and sends it to the ePDG.
14. The ePDG checks the correctness of the AUTH received from the UE. At this point the UE is authenticated. In case a tentative PMIP tunnel is used, the PMIP Binding Update is sent from the ePDG to the PDN GW.
15. The PDN-GW responds with a PMIP Binding Acknowledge (including the assigned IP address/prefix).
16. The ePDG calculates the AUTH parameter which authenticates the second IKE_SA_INIT message. The ePDG sends the assigned IP address/prefix in the configuration payload (CFG_REPLY). The AUTH parameter is sent to the UE together with the configuration payload, security associations and the rest of the IKE parameters and the IKE negotiation terminates.

One important aspect when using the procedure describes above, is how the MME determines the ePDG IP address, despite the transparent tunneling from the UE to the ePDG. There are several different ways to achieve this. First, the UE may have a pre-configured ePDG IP address that is used in case the IKE/IPsec tunnel is established over a transparent tunnel. An II address of the same ePDG is also pre-configured in the MME, and the MME forwards all IKE messages from UEs to this ePDG. Second, the UE may include the ePDG IP address in a non-transparent part of the UL Information Transfer message. This part is also copied by the eNB in the Uplink S1 Tunnelling messages and then, the MME can determine the appropriate ePDG, for example either by using the IP address provided by the UE directly or by mapping the IP address to another corresponding address. Third, the MME may be pre-configured with a default ePDG, that can be different from the ePDG selected by the UE. The MME sends the message to this default ePDG and in case it is the wrong ePDG, i.e. not the one of the IKE message, the ePDG sends a relocation trigger to the MME with the IP address of the ePDG included in the IKE message. Then, the MME forwards the transparent message to this new ePDG. Fourth, the UE includes an anycast IP address as destination address in the IKE_SA_INIT message. Then, the MME selects an arbitrary ePDG and the ePDG replies with its real IP address that is used by the UE in the following IKE messages.

One additional issue here is that the IP address used by the MME for the communication with the ePDG over the direct interface can be different from the IP address used by the UE for the IKE signalling, because the MME may use an IP address of an internal interface of the ePDG instead of the external IP address used by the UE. Therefore, in this case some additional functionality may be required at the ePDG or the UE to determine the appropriate IP address Only minimal changes are required for a MME, which already supports the S101 interface. According to the optimized HRPD handover, the eNB includes a statically configured Sector ID in the Uplink S1 Tunnelling message. The Sector ID is then used by the MME to determine the correct HRPD access node. In case of the S101ePDG interface and the transparent tunnelling to the ePDG, the Sector ID may be re-used and may correspond to the ePDG, e.g. the ePDG IP address. And either the Sector ID is also in this case statically configured in the eNB or it is provided by the UE to the eNB. Other messages, i.e. the UL/DL Information transfer between the UE and the eNB can be reused; the UL/DL S1 Tunnelling between the eNB and the MME can be reused; the Direct Transfer Request between MME and ePDG can be used, identical to the MME-HRPD. With this solution the UE-ePDG IKE signalling can be performed transparently over the E-UTRAN and EPC, and the tentative IKE SA can be established although the ePDG is not reachable from the PDN.

As already explained with regard to FIGS. 15a and 15b, there may be cases in which the UE performs a handover between two non-3GPP networks, i.e. between two ePDGs. According to a further embodiment of the invention, a new direct interface may be considered between the two ePDGs. Accordingly, before doing the handover to the other target ePDG, the UE might reach the target ePDG via the source ePDG in order to pre-establish the tentative IE/IPsec SA with the target ePDG, and optionally establish the tentative IPsec tunnel between the target ePDG and the PDN-GW.

As described above, one problem of ePDG unreachability from a particular PDN may be that there is a firewall in the PDN or PDN-GW that blocks all traffic from/to external networks. However, one way to solve this problem is that the PDN-GW/Firewall can be configured (or triggered by the UE) to let messages for the pre-establishment of a tentative IKE/IPsec SA to the ePDG pass. For this the PDN-GW needs to know that the signalling is for ePDG tunnel pre-establishment of an existing PDN connection (in case PDN is private/corporate network and global IPv6 addresses are used, usually packets to nodes not part of private/corporate network are blocked). Therefore, the PDN-GW can be configured with ePDG IP addresses, however, the PDN-GW might not know all possible ePDGs (e.g. difficult in roaming scenarios). Another possibility is that the UE informs the PDN-GW via PCO (protocol configuration options) about the ePDG IP address. But PCO may not work in all accesses, for example if the UE is in a trusted non-3GPP access (like WiMAX), PCO might not be supported.

Thus, another alternative is that the PDN-GW allows the UE to signal IKE messages to external nodes. In order to make the PDN-GW aware that these messages must be routed to the external Internet and not to private/corporate network first, the UE includes in the IKE_SA_INIT a new IKE notify payload from type "external ePDG pre-establishment" to inform the PDN-GW about IKE with external ePDG. The PDN-GW checks the IKE_SA_NIT messages from the UE, if the payload is included, the packet is routed to the Internet, otherwise to the private/corporate network. Then, the PDN-GW needs to know that the IKE/IPsec SA is established with a valid ePDG. Therefore, the UE includes a "PDN-GW notification flag" during IKE signalling with the ePDG that triggers the AAA server to inform the PDN-GW about the validity of the ePDG (both notifications can be combined).

Figure 21:
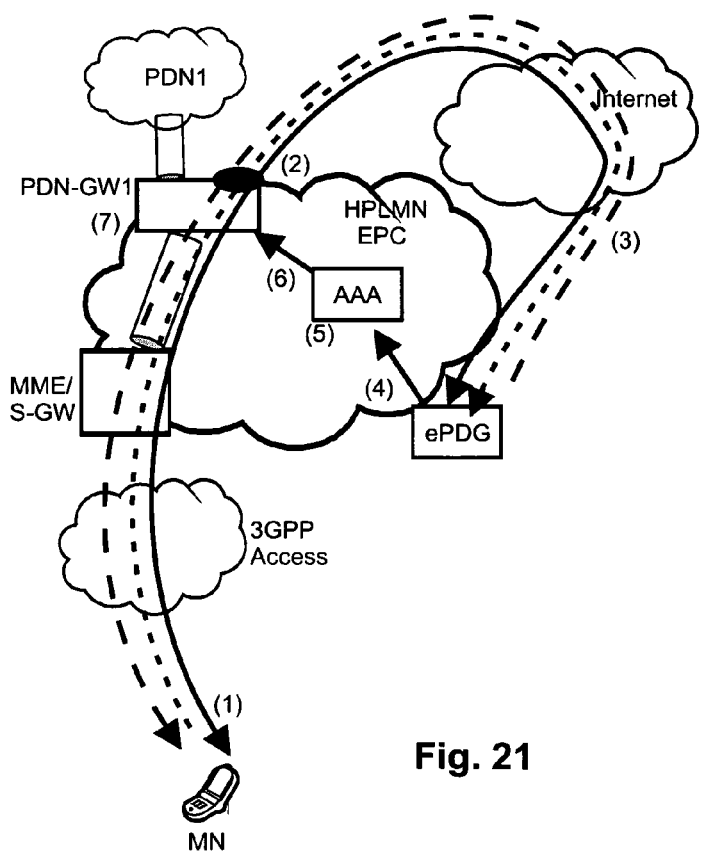
FIG. 21 illustrates procedural steps of an alternative that opens a hole in a firewall in a PDN or PDN-GW, to prevent the firewall from blocking all traffic from/to external networks.

The procedural steps of the alternative described above, that opens a hole in the firewall, is shown in FIG. 21.

1. The IKE_SA_INIT with the ePDG is performed (including NAT detection and including new EXTERNAL_EPDG_PREESTABLISHMENT notify payload).
2. The PDN-GW inspects the IKE message, detects the notify payload, performs NAT (if necessary) and lets the IKE_SA_INIT pass to the external Internet.
3. The Initial IKE_AUTH Request is passed through by the PDN-GW (including user ID, APN and new "PDN-GW notification flag" if not already included during IKE_SA_INIT).
4. The ePDG sends Authentication-Request/Identity to AAA server (including user ID, APN and in addition new "PDN-GW notification flag").
5. The AAA server retrieves the user subscription profile from the HSS (including PDN-GW identity) and in addition determines the PDN-GW from the APN and the PDN-GW identity.
6. The MA server notifies the PDN-GW about the user ID and the ePDG.
7. The PDN-GW allows all following IKE messages and packets between UE and external ePDG to pass through.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for ensuring IP session continuity upon a handover of a mobile node from a source network to a non-3GPP network, wherein the mobile node is first located in the source network and has an ongoing IP session via a packet data network in the source network, the method comprising:
    while the mobile node is attached to the source network, the method comprises the steps of:
        establishing a tentative security association between the mobile node and a security gateway, the security gateway providing for the source network a secure communication intermediate to the non-3GPP network; and
        establishing a tentative tunnel between the security gateway and the packet data network gateway; and
    after performing the handover of the mobile node to the non-3GPP network, the method further comprises the steps of:
        activating the tentative security association between the mobile node and the security gateway by using the mobile node's local address in the non-3GPP network, for establishing a secure tunnel between the mobile node and the security gateway; and
        activating the tentative tunnel between the packet data network gateway and the security gateway.

2. The method according to claim 1, wherein the security gateway is informed about the IP address of the mobile node, which is to be used for the establishment of the security association.

3. The method according to claim 2, wherein the security gateway is informed about the IP address of the mobile node implicitly or explicitly.

4. The method according to claim 1, wherein the tentative security association is established between the security gateway and the mobile node using an address of the mobile node allocated when in the source network, and
    wherein activating the tentative security association comprises exchanging the address of the mobile node allocated when in the source network with a local address of the mobile node in the non-3GPP network.

5. The method according to claim 1, wherein the step of establishing the tentative security association comprises the step of:
    detecting by the security gateway that the tentative security association is tentative based on
        an indication provided by the mobile node to the security gateway, or based on
        the mobile node's address being allocated when in the source network, or based on
        an inquiry to an authentication server, contacted by the security gateway during the establishment of the tentative security association.

6. The method according to claim 1, wherein the step of establishing the tentative tunnel between the packet data network gateway and the security gateway comprises the step of:
    upon establishing the tentative security association, configuring by the security gateway a tentative binding cache entry at the packet data network gateway using the address of the security gateway.

7. The method according to claim 1, wherein a general security gateway identification is provided to the mobile node during the step of establishing the tentative security association or the tentative tunnel, and wherein the step of activating the tentative tunnel comprises transmitting a message from the mobile node to the packet data network gateway comprising the general security gateway identification.

8. The method according to claim 1, wherein the tentative tunnel between the packet data network gateway and the security gateway is established by the security gateway and activated by the mobile node, the method further comprising the step of:

receiving by the mobile node an authentication token, for later authorizing the mobile node to activate the tentative tunnel established by the security gateway.

9. The method according to claim 1, wherein a plurality of non-3GPP networks are available for the handover of the mobile node, and wherein at least one security gateway candidate is determined for the plurality of non-3GPP networks, a tentative security association is established between the mobile node and each determined security gateway candidate, a tentative tunnel is established between the packet data network gateway and each determined security gateway candidate, and wherein when performing the handover of the mobile node to a target non-3GPP network, updating the tentative security association and activating the tentative tunnel established for the target security gateway of the target non-3GPP network.

10. The method according to claim 9, wherein the step of establishing a tentative security association with each determined security gateway candidate comprises the step of:

transmitting from each determined security gateway candidate to the mobile node information on access networks preferable for each determined security gateway candidate, and wherein said information on access networks is used by the mobile node to determine the target security gateway among the security gateway candidates.

11. The method according to claim 1, wherein the mobile node establishes a second IP session via a second packet data network gateway, and the step of establishing the second IP session further comprises the steps of:

establishing a second tentative tunnel between the second packet data network gateway and the security gateway for the second IP session.

12. The method according to claim 11, wherein the step of establishing the second IP session further comprises the steps of:

transmitting a general security gateway identification from the mobile node to the second packet data network gateway, wherein the second tentative tunnel is established by the second packet data network gateway using the general security gateway identification.

13. The method according to claim 1, wherein the source network is a non-3GPP network and the ongoing IP session of the mobile node goes via a security gateway of the source non-3GPP network, the method further comprising the steps performed after the handover of the mobile node to the target non-3GPP network:

updating a security association between the security gateway of the source non-3GPP network and the mobile node by using the mobile node's home address for establishing a tentative state of said security association between the security gateway of the source non-3GPP network and the mobile node, changing a tunnel between the packet data network gateway and the security gateway of the source non-3GPP network used for the IP session into a tentative state.

14. The method according to claim 1, wherein a direct interface is established between the security gateway and an entity in the source network, and wherein the tentative security association is established between the mobile node and the security gateway by communicating over the direct interface between the entity in the source network and the security gateway.

15. The method according to claim 14, wherein the entity in the source network is a mobility management entity and wherein the mobility management entity learns the IP address of the security gateway by:

a pre-configuration in the mobility management entity, or the mobile node transmitting the IP address of the security gateway to the mobility management entity, or by pre-configuring a particular security gateway in the mobility management entity, by transmitting messages received from the mobile node relating to the pre-establishment of the tentative security association from the mobility management entity to said pre-configured security gateway, and in case the pre-configured security gateway is not the security gateway with which the tentative security association is to be established, by the pre-configured security gateway transmitting the IP address of said intended security gateway to the mobility management entity, or by selecting an arbitrary security gateway, by transmitting messages received from the mobile node relating to the pre-establishment of the tentative security association from the mobility management entity to said arbitrary security gateway, and in case the arbitrary security gateway is not the security gateway with which the tentative security association is to be established, by the arbitrary security gateway transmitting the IP address of said intended security gateway to the mobility management entity.

16. A mobile node attached to a source network for ensuring IP session continuity upon a handover of the mobile node to a non-3GPP network, wherein the mobile node has an ongoing IP session via a packet data network gateway in the source network, the mobile node comprising:

a receiver and a transmitter structured to exchange messages with a security gateway for establishing a tentative security association between the mobile node and the security gateway, while the mobile node is attached to the source network, the security gateway providing for the source network a secure communication intermediary to the non-3GPP network and in response to the establishment of the tentative security association, the security gateway is structured to establish a tentative tunnel between the security gateway and the packet data network gateway;

after performing the handover of the mobile node to the non-3GPP network, the receiver and transmitter of the mobile node are further structured to exchange messages with the security gateway for updating the tentative security association between the mobile node and the security gateway by using the mobile node's local address in the non-3GPP network for establishing a secure tunnel between the mobile node and the security gateway and the transmitter is further structured to transmit a message to the packet data network gateway for activating the tentative tunnel to the security gateway.

17. A security gateway for providing a secure communication intermediary to non-3GPP networks and for ensuring IP session continuity for a mobile node upon a handover from a source network to one of the non-3GPP networks, wherein the mobile node is first located in the source network and has an ongoing IP session via a packet data network gateway in the source network, the security gateway comprising:
 a receiver and transmitter structured to exchange messages with the mobile node for establishing a tentative security association between the mobile node and the security gateway, while the mobile node is attached to the source network; and
 a processor structured to:
  initiate the establishment of a tentative tunnel between the security gateway and the packet data network gateway, in response to the establishment of the tentative security association and while the mobile node is attached to the source network; and
  activate the tentative security association between the mobile node and the security gateway by using the mobile node's local address in the non.3GPP network for establishing a secure tunnel between the mobile node and the security gateway, after performing the handover of the mobile node to the non-3GPP network; and
  activate the tentative tunnel between the packet data network gateway and the security gateway, after performing the handover of the mobile node to the non 3GPP network.

18. A method for ensuring IP session continuity upon a handover of a mobile node from a source network to a non-3GPP network wherein the mobile node is first located in the source network and has an ongoing IP session via a packet data network gateway in the source network, the method comprising:
 while the mobile node is attached to the source network, the method comprises the steps of:
  establishing a tentative security association between the mobile node and a security gateway, the security gateway providing for the source network a secure communication intermediary to the non-3GPP network;
  establishing a tentative tunnel between the security gateway and the packet data network gateway; and
  activating the tentative tunnel between the packet data network gateway and the security gateway; and
 after performing the handover of the mobile node to the non-3GPP network, the method further comprises the steps of:
  activating the tentative security association between the mobile node and the security gateway by using the mobile node's local address in the non-3GPP network for establishing a secure tunnel between the mobile node and the security gateway.

19. A mobile node attached to a source network for ensuring IP session continuity upon a handover of the mobile node to a non-3GPP network, wherein the mobile node has an ongoing IP session via a packet data network gateway in the source network, the mobile node comprising:
 a receiver and a transmitter structured to:
  exchange messages with a security gateway for establishing a tentative security association between the mobile node and the security gateway, while the mobile node is attached to the source network, the security gateway providing for the source network a secure communication intermediary to the non-3GPP network, while the mobile node is attached to the source network, and in response to the establishment of the tentative security association, the security gateway is structured to establish a tentative tunnel between the security gateway and the packet data network gateway, and
  while the mobile node is attached to the source network, the transmitter is further structured to transmit a message to the packet data network gateway for activating the tentative tunnel to the security gateway; and
 after performing the handover of the mobile node to the non-3GPP network, the receiver and transmitter of the mobile node are further structured to exchange messages with the security gateway for updating the tentative security association between the mobile node and the security gateway by using the mobile node's local address in the non-3GPP network for establishing a secure tunnel between the mobile node and the security gateway.

* * * * *